(12) United States Patent
Goenka et al.

(10) Patent No.: US 11,575,762 B2
(45) Date of Patent: Feb. 7, 2023

(54) SUBSCRIPTION-BASED MESSAGE SELECTION AND TRANSMISSION

(71) Applicant: Oath Inc., New York, NY (US)

(72) Inventors: Mohit Goenka, Santa Clara, CA (US); Ashish Khushal Dharamshi, Sunnyvale, CA (US); Nikita Varma, Milpitas, CA (US); Gnanavel Shanmugam, San Jose, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 154 days.

(21) Appl. No.: 16/210,116

(22) Filed: Dec. 5, 2018

(65) Prior Publication Data

US 2020/0186610 A1    Jun. 11, 2020

(51) Int. Cl.
*G06F 15/16* (2006.01)
*H04L 67/306* (2022.01)
*G06F 16/9535* (2019.01)
*H04L 51/046* (2022.01)
*H04L 51/214* (2022.01)
*H04L 67/55* (2022.01)

(52) U.S. Cl.
CPC ........ *H04L 67/306* (2013.01); *G06F 16/9535* (2019.01); *H04L 51/046* (2013.01); *H04L 51/214* (2022.05); *H04L 67/55* (2022.05)

(58) Field of Classification Search
CPC ..... H04L 67/306; H04L 67/26; H04L 51/046; H04L 51/14; H04L 51/214; H04L 67/55; G06F 16/9535; G06F 16/9537
See application file for complete search history.

(56) References Cited

U.S. PATENT DOCUMENTS

| | | | |
|---|---|---|---|
| 9,166,961 B1 * | 10/2015 | Johansson | H04L 63/102 |
| 9,189,791 B2 * | 11/2015 | Farkas | G06Q 30/02 |
| 9,338,108 B2 * | 5/2016 | Kamens | H04L 51/066 |
| 9,602,494 B2 * | 3/2017 | Syed | H04L 67/53 |
| 10,021,126 B2 * | 7/2018 | Irimie | H04L 63/1433 |
| 10,204,230 B2 * | 2/2019 | Zhang | H04L 63/104 |
| 10,445,382 B2 * | 10/2019 | Hyatt | G06F 16/335 |
| 10,460,348 B1 * | 10/2019 | Peddinti | G06Q 30/0277 |
| 10,673,802 B2 * | 6/2020 | Volach | G06Q 10/107 |
| 10,679,608 B2 * | 6/2020 | Mixter | H04L 51/224 |
| 10,783,883 B2 * | 9/2020 | Mixter | H04L 67/306 |

(Continued)

*Primary Examiner* — Ario Etienne
*Assistant Examiner* — Thorne E Waugh
(74) *Attorney, Agent, or Firm* — Cooper Legal Group LLC

(57) ABSTRACT

One or more computing devices, systems, and/or methods for selecting messages for transmission to client devices are provided. A first message associated with a first entity may be received from a first client device. The first message may comprise information associated with the first entity. A user account database, comprising a plurality of user profiles, may be analyzed based upon the first message to select a set of user accounts, from a plurality of user accounts, for transmission of a set of messages associated with the first message. The plurality of user accounts may be subscribed to an information service. Each user profile of the plurality of user profiles may comprise information corresponding to a user account of the plurality of user account. The set of messages may be transmitted to the set of user accounts.

20 Claims, 10 Drawing Sheets

(56) References Cited

U.S. PATENT DOCUMENTS

| | | | | |
|---|---|---|---|---|
| 2003/0200334 | A1* | 10/2003 | Grynberg | H04L 51/48 |
| | | | | 709/206 |
| 2006/0031328 | A1* | 2/2006 | Malik | H04L 51/23 |
| | | | | 709/206 |
| 2007/0124385 | A1* | 5/2007 | Denny | H04L 67/55 |
| | | | | 709/206 |
| 2009/0300066 | A1* | 12/2009 | Guo | H04L 61/50 |
| 2009/0310580 | A1* | 12/2009 | Chapman | H01Q 1/526 |
| | | | | 455/431 |
| 2010/0191598 | A1* | 7/2010 | Toennis | G06Q 30/0269 |
| | | | | 705/14.66 |
| 2010/0274887 | A1* | 10/2010 | Sanghavi | G06Q 30/02 |
| | | | | 709/224 |
| 2011/0119593 | A1* | 5/2011 | Jacobson | H04L 67/306 |
| | | | | 715/736 |
| 2011/0154474 | A1* | 6/2011 | Siegel | H04L 51/214 |
| | | | | 726/12 |
| 2014/0006158 | A1* | 1/2014 | Cooper | G06Q 30/02 |
| | | | | 705/14.56 |
| 2014/0196129 | A1* | 7/2014 | Amin | H04L 63/08 |
| | | | | 726/6 |
| 2014/0316927 | A1* | 10/2014 | Ganesan | G06Q 30/0611 |
| | | | | 705/26.4 |
| 2016/0335572 | A1* | 11/2016 | Bennett | G06Q 10/107 |
| 2017/0054770 | A1* | 2/2017 | Wells | H04L 65/65 |
| 2018/0122378 | A1* | 5/2018 | Mixter | H04L 67/306 |
| 2019/0171650 | A1* | 6/2019 | Botev | G06F 16/2358 |

* cited by examiner

SUBSCRIPTION-BASED MESSAGE SELECTION AND TRANSMISSION

BACKGROUND

Many entities (e.g., clothing stores, restaurants, department stores, car dealers, etc.) may offer information services where a user may subscribe to an information service associated with an entity and/or may receive information (e.g., newsletters, promotional information, etc.) related to the entity. The user may be required to provide personal information (e.g., email address, phone number, mailing address, etc.) in order to subscribe to the information service. However, as a result of providing the personal information, the personal information may be disclosed to entities, other than the entity, without the user's permission and/or the personal information may be misused.

SUMMARY

In accordance with the present disclosure, one or more computing devices and/or methods are provided. In an example, a first email associated with a first entity may be received from a first email account. The first email may comprise information associated with the first entity. An email account database, comprising a plurality of user profiles, may be analyzed based upon the first email to select a set of email accounts, from a plurality of email accounts, for transmission of a set of emails associated with the first email. The plurality of email accounts may be subscribed to an information service. Each user profile of the plurality of user profiles may comprise information corresponding to an email account of the plurality of email accounts. The set of emails may be transmitted to the set of email accounts.

In an example, a first message associated with a first entity may be received from a first client device. The first message may comprise information associated with the first entity. A user account database, comprising a plurality of user profiles, may be analyzed based upon the first message to select a set of user accounts, from a plurality of user accounts, for transmission of a set of messages associated with the first message. The plurality of user accounts may be subscribed to an information service. Each user profile of the plurality of user profiles may comprise information corresponding to a user account of the plurality of user accounts. The set of messages may be transmitted to a set of client devices associated with the set of user accounts.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
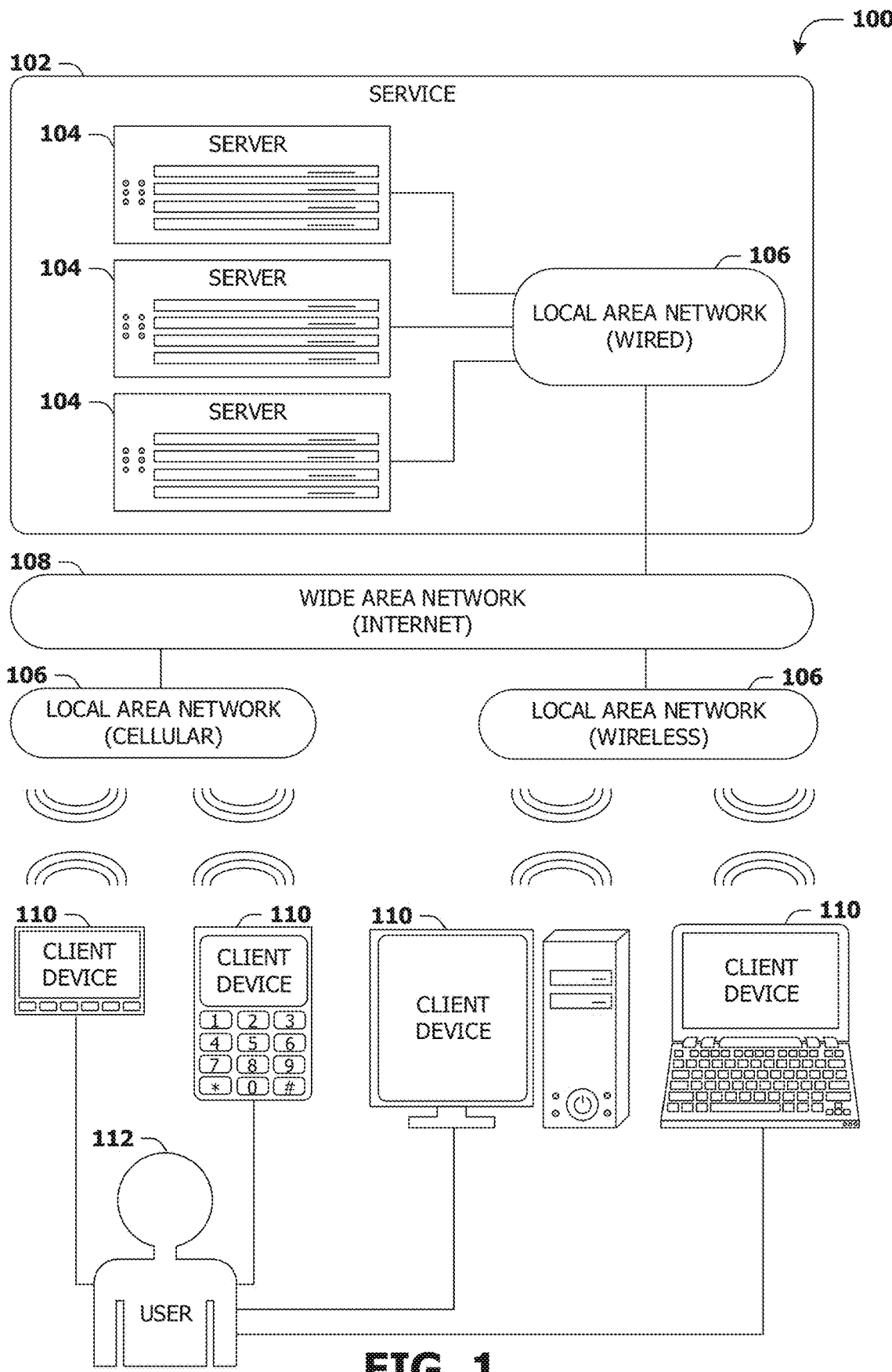
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
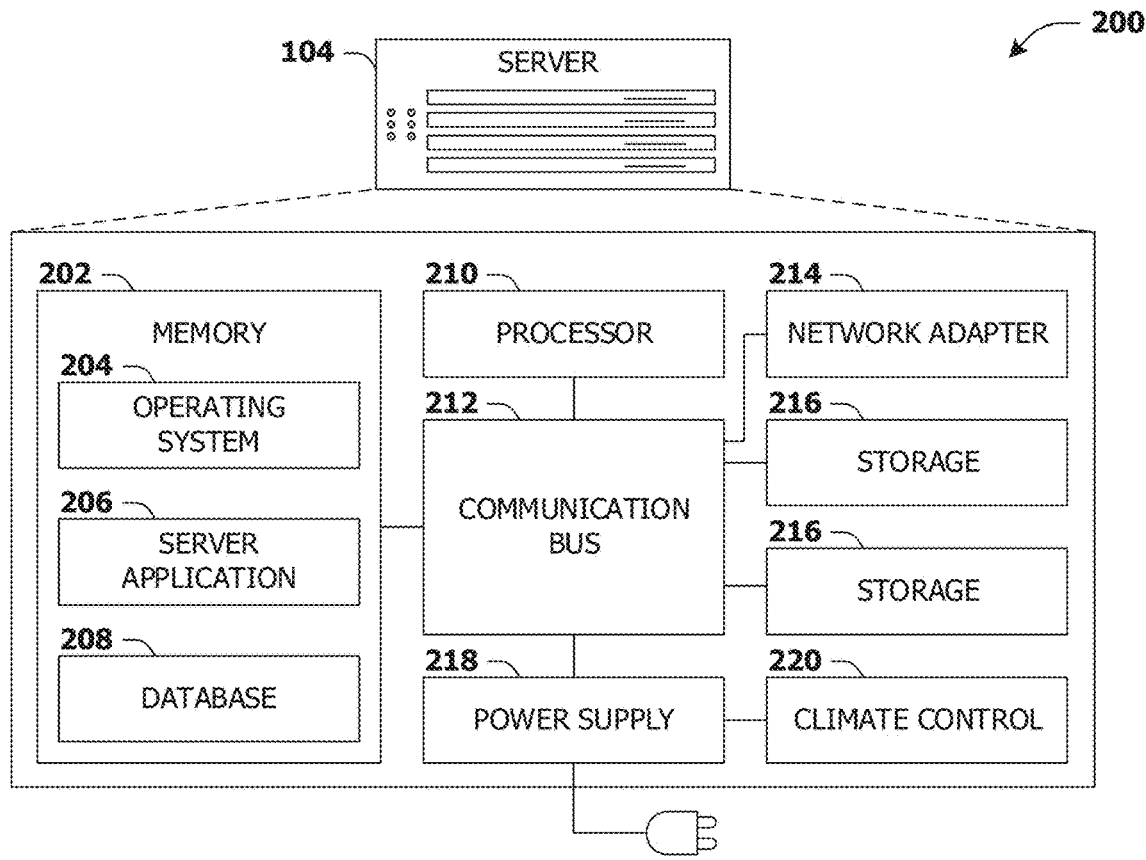
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
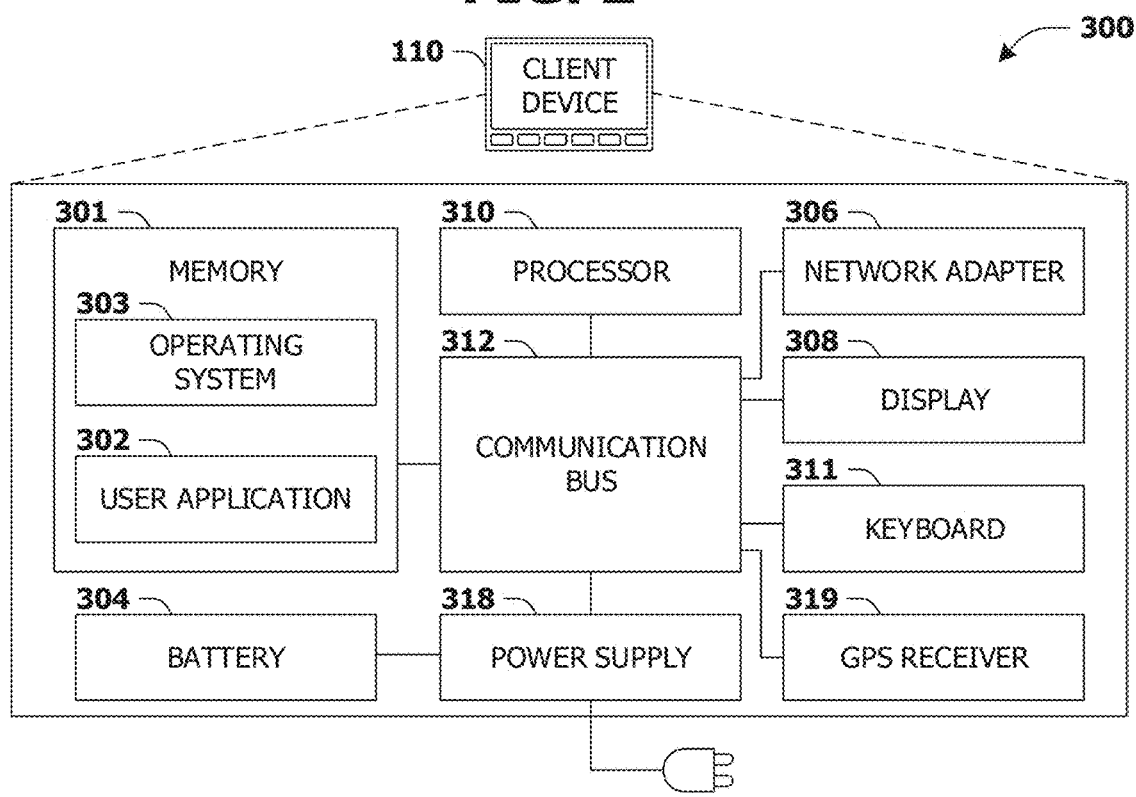
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selecting messages for transmission to client devices are provided. For example, entities (e.g., clothing stores, restaurants, department stores, car dealers, etc.) may offer information services. A user may subscribe to a subscription service (e.g., a bi-weekly newsletter, an email list, etc.) associated with an entity in order to receive information (e.g., car deals, newly added products, sales, etc.) related to the entity. The user may be required to provide personal information (e.g., email address, phone number, mailing address, etc.) in order to subscribe to the subscription service. For example, the user may subscribe to a plurality of subscription services associated with a plurality of entities. Personal information associated with the user may be misused and/or used in ways the user does not approve (e.g., the personal information may be disclosed to entities other than the entity without the user's permission, the personal information may be collected and/or used for purposes different than providing subscription services, etc.). Alternatively and/or additionally, the user may lose interest in one or more subscription services of the plurality of subscription services and/or may want to discontinue receiving information from the one or more subscription services. However, it may be difficult and/or tedious for the user to identify each subscription of the one or more subscription services and/or unsubscribe from each subscription of the one or more subscription services.

In accordance with one or more of the techniques presented herein, a user profile associated with a user account (e.g., an email account) may be generated. For example, the user profile may comprise information corresponding to the user account. For example, the user profile may be indicative of entities associated with the user account (e.g., entities that a user associated with the user account may be interested in), locations associated with the user account (e.g., a home location where the user lives, a work location where the user works, locations associated with trips, geolocation information, etc.), topics associated with the user account (e.g., subject matter that the user may be interested in), times of day associated with the user account (e.g., times of day that the user may prefer receiving messages), etc. The user profile may be generated based upon inputs received from a client device associated with the user account, activity information associated with the user account (e.g., search history information, website browsing history, email information, etc.), user demographic information, location information of the client device, etc.

The user account may be subscribed to a first information service associated with a plurality of entities. A server associated with the first information service may receive a first message from a first client device associated with a first entity of the plurality of entities. A user account database may be analyzed based upon the first message to select a set of user accounts for transmission of a set of messages associated with the first message. For example, the user account may be included in the set of user accounts based upon the user profile. The set of messages may be transmitted to a set of client devices associated with the set of user accounts. In some examples, the set of messages may be emails and/or the set of user accounts may be a set of email accounts. For example, the set of emails may be transmitted to the set of email accounts.

Figure 4:
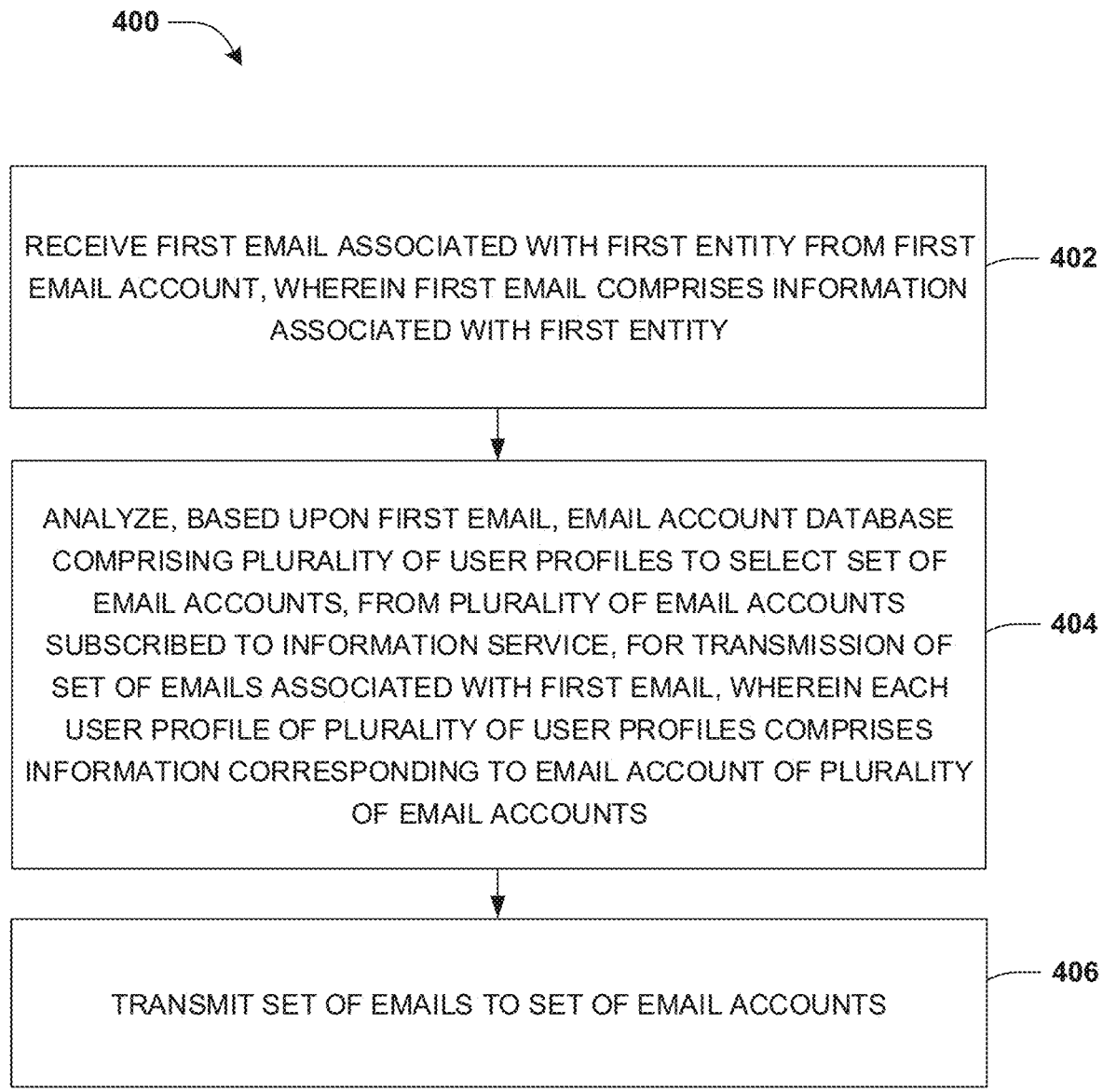
FIG. 4 is a flow chart illustrating an example method for selecting messages for transmission to client devices.

An embodiment of selecting messages for transmission to client devices is illustrated by an example method 400 of FIG. 4. A first user, such as user Jill, (e.g., and/or a first client device associated with the first user) may access and/or interact with an email service (and/or a communication service) for sending and/or receiving emails and/or performing communications via messaging, voice calls, video calls, etc. For example, a first email account (and/or a different type of user account) of the first user with the communication service may be accessed and/or interacted with via one or more interfaces of an email client, a browser, an application, etc. on the first client device.

In some examples, the first email account may be subscribed to an information service. For example, the information service may be associated with a content system. The content system may transmit messages (e.g., emails) to a plurality of email accounts subscribed to the information service. Alternatively and/or additionally, the information service may be associated with a plurality of entities. For example, entities of the plurality of entities may be companies, stores, chain stores, internet stores, marketplaces, resellers, organizations, universities, schools, spiritual centers, etc. In some examples, the messages transmitted to the plurality of email accounts may be generated based upon messages (e.g., emails, files, etc.) received from the plurality of entities.

In some examples, the information service may be associated with a plurality of topics. The plurality of topics may comprise a first topic "travel", a second topic "electronics", a third topic "shopping", a fourth topic "finance", a fifth topic "business", a sixth topic "digital magazines", a seventh topic "tech conferences", an eighth topic "home improvement", a ninth topic "flights and airlines", a tenth topic "hotels", an eleventh topic "clothing" and/or other topics. Alternatively and/or additionally, the information service may be associated with merely a set of topics (e.g., a set of one or more topics) of the plurality of topics. For example, the content system may provide a plurality of information services, where each information service of the plurality of information services may be associated with a set of topics of the plurality of topics. For example, the information service may be associated with the plurality of topics, a second information service may be associated with a first set of topics of the plurality of topics (e.g., the first set of topics may comprise the second topic), a third information service may be associated with a second set of topics of the plurality of topics (e.g., the second set of topics may comprise the first topic, the ninth topic and/or the tenth topic), etc. In some examples, the first email account may be subscribed to one or more information services of the plurality of information services (including the information service).

In some examples, the first email account may be subscribed to the information service responsive to receiving a first subscription request, associated with the first email account, from the first client device. For example, the first subscription request may be received via a subscription interface. The subscription interface may be accessed via the email client, the browser, the application, etc. on the first client device. For example, the subscription interface may comprise a list of information services comprising the plurality of information services. Responsive to a selection of the information service from the list of information services, the first subscription request may be transmitted to the content system and/or the first email account may be subscribed to the information service.

In some examples, a first user profile corresponding to the first email account may be generated. For example, the first user profile may be generated responsive to receiving the first subscription request and/or the first email account subscribing to the information service. The first user profile may be indicative of first entities associated with the first email account (e.g., entities that the first user may be interested in and/or may not be interested in). For example, the first user profile may comprise a first list of entities indicative of entities of the plurality of entities that the first user may have an interest in.

For example, the first list of entities may be generated based upon location information associated with the first email account. For example, one or more entities may be added to the first list of entities responsive to a determination that a location of the first client device and/or the first user matches locations of the one or more entities. In an example, the first user may visit a structure associated with a first entity (e.g., a clothing store). Responsive to a determination that a location of the first client device matches a location of the first entity, the first entity may be added to the first list of entities.

Alternatively and/or additionally, the first list of entities may be generated based upon email activity associated with the first email account. For example, one or more entities may be added to the first list of entities responsive to a determination that one or more emails received and/or transmitted by the first email account are associated with the one or more entities. In an example, the first email account may receive an order confirmation email (e.g., a sales receipt) from an email account associated with a second entity. The second entity may be added to the first list of entities responsive to the first email account receiving the order confirmation email (based upon a determination that the order confirmation email is associated with the second entity). In a second example, the second entity may be added to the first list of entities responsive to the first email account transmitting an email to an email account comprising an indication of the second entity.

Alternatively and/or additionally, the first list of entities may be generated based upon search activity. For example, one or more entities may be added to the first list of entities responsive to a determination that one or more queries used to perform searches on the first client device (and/or a different client device associated with the first email account) comprise indications of the one or more entities. In an example, a query (e.g., "Tom's hardware") may be inputted into a search engine interface. A search may be performed based upon the query and/or a plurality of search results may be generated based upon the query. It may be determined that the query is associated with a third entity (e.g., "Tom's Hardware Store"). For example, the third entity may be added to the first list of entities responsive to determining that the query is associated with the third entity.

Alternatively and/or additionally, the first list of entities may be generated based upon content (e.g., web pages, content items such as videos, images, audio, social media posts, etc.) accessed by the first client device (and/or a different client device associated with the first email account). In an example, a first web page (e.g., "www.jasonsclothes.com") provided by a fourth entity (e.g., "Jason's Clothes Internet Market") may be accessed by the first client device. For example, the fourth entity may be added to the first list of entities responsive to the first web page being accessed. Alternatively and/or additionally, a second web page (e.g., "www.clothingwearhouse.com") may be accessed by the first client device. For example, the second web page may be associated with a product (e.g., clothing) that the fourth entity provides. For example, the fourth entity may be added to the first list of entities responsive to the second web page being accessed.

Alternatively and/or additionally, the first list of entities may be generated based upon one or more user settings messages received from the first client device (and/or a different client device associated with the first email account). For example, the one or more user settings messages may be received via a settings interface. The settings interface may be provided by the email client, the browser, the application, etc. on the first client device. For example, the settings interface may comprise a plurality of selectable inputs corresponding to settings associated with the information service. For example, the settings interface may comprise an entity list comprising the plurality of entities. For example, one or more entities may be added to the first list of entities responsive to selections of the one or more entities from the entity list. For example, responsive to the selections of the one or more entities, the first client device may transmit the one or more settings messages indicative of the one or more entities to the content system. The one or more entities may be added to the first list of entities responsive to receiving the one or more settings messages.

Alternatively and/or additionally, the first user profile may comprise a second list of entities indicative of entities of the plurality of entities that the first user may not have an interest in. For example, the second list of entities may be generated based upon location information associated with the first email account. For example, one or more entities may be added to the second list of entities responsive to a determination that the first user and/or the first client device do not (and/or rarely) visit locations associated with the one or more entities. In an example, a fifth entity may be added to the second list of entities responsive to a determination that a number of instances that the first client device visited the fifth entity is less than a threshold number of instances.

Alternatively and/or additionally, the second list of entities may be generated based upon email activity associated with the first email account. For example, an entity may be added to the second list of entities responsive to a determination that a quantity of emails that are associated with the entity and received and/or transmitted by the first email account is less than a threshold quantity of emails (e.g., the quantity of emails may be 0 emails associated with the entity that are received and/or transmitted, 1 email associated with the entity that is received and/or transmitted, 2 emails associated with the entity that is received and/or transmitted, etc.). Alternatively and/or additionally, an entity may be added to the second list of entities responsive to a determination that a proportion of emails that are associated with the entity and received and/or transmitted by the first email account (relative to a first total set of emails that are associated with the entity and/or relative to a second total set of emails received and/or transmitted by the first email account) is less than a threshold proportion of emails (e.g., the proportion of emails may be 0% of emails associated with the entity that are received and/or transmitted, 40% of emails associated with the entity that are received and/or transmitted, 70% of emails associated with the entity that are received and/or transmitted, etc.).

Alternatively and/or additionally, an entity may be added to the second list of entities responsive to a determination that a quantity of emails that are associated with the entity and selected and/or consumed using the email client is less than a threshold quantity of emails (e.g., the quantity of emails may be 0 emails associated with the entity that are selected and/or consumed, 1 email associated with the entity that is selected and/or consumed, etc.). Alternatively and/or additionally, an entity may be added to the second list of entities responsive to a determination that a proportion of emails that are associated with the entity and selected and/or consumed using the email client (relative to a total set of emails that are associated with the entity and received by the first email account) is less than a threshold proportion of emails (e.g., the proportion of emails may be 0% of emails associated with the entity that are selected and/or consumed, 50% of emails associated with the entity that are selected and/or consumed, etc.).

Alternatively and/or additionally, an entity may be added to the second list of entities responsive to a determination that a quantity of emails that are associated with the entity and marked as undesirable (e.g., deleted, marked as spam, marked as junk, etc.) using the email client is more than a threshold quantity of emails (e.g., the quantity of emails may be 5 emails associated with the entity that are marked as undesirable, 10 emails associated with the entity that are marked as undesirable, etc.). Alternatively and/or additionally, an entity may be added to the second list of entities responsive to a determination that a proportion of emails that are associated with the entity and marked as undesirable (e.g., deleted, marked as spam, marked as junk, etc.) using the email client (relative to a total set of emails that are associated with the entity and received by the first email account) is more than a threshold proportion of emails (e.g., the proportion of emails may be 0% of emails associated with the entity that are marked as undesirable, 80% of emails associated with the entity that are marked as undesirable, etc.).

Alternatively and/or additionally, the second list of entities may be generated based upon search activity. For example, an entity may be added to the second list of entities responsive to a determination that a quantity of queries used to perform searches that are associated with the entity is less than a threshold quantity of queries (e.g., the quantity of queries may be 0 queries associated with the entity that is used to perform a search, 1 query associated with the entity that is used to perform a search, etc.). Alternatively and/or additionally, an entity may be added to the second list of entities responsive to a determination that a proportion of queries used to perform searches that are associated with the entity (relative to a total set of queries used to perform searches) is less than a threshold proportion of queries (e.g., the proportion of queries may be 0% of queries used to perform searches are associated with the entity, 20% of queries used to perform searches are associated with the entity, etc.).

Alternatively and/or additionally, the second list of entities may be generated based upon one or more second user settings messages received from the first client device (and/or a different client device associated with the first email account). For example, the one or more second user settings messages may be received via the settings interface. For example, the settings interface may comprise a second entity list comprising the plurality of entities. For example, one or more entities may be added to the second list of entities responsive to selections of the one or more entities from the second entity list.

Alternatively and/or additionally, rather than maintaining the second list of entities, merely the first list of entities may be maintained. For example, rather than adding entities to the second list of entities based upon location information, email activity, search activity and/or user settings messages, the entities may be removed from the first list of entities based upon location information, email activity, search activity and/or user settings messages.

Alternatively and/or additionally, the first list of entities may be indicative of levels of interest associated with entities of the first list of entities. For example, the first list of entities may comprise indications of levels of interest associated with each entity of the first list of entities. In some examples, a level of interest may correspond to a level of activity associated with an entity (e.g., a quantity of instances that a location of an entity is visited, a level of email activity associated with the entity, a quantity and/or proportion of queries associated with the entity used to perform searches, a quantity and/or proportion of webpages associated with the entity that are accessed, etc.).

Alternatively and/or additionally, a plurality of lists of entities may be generated where each list of entities of the plurality of lists of entities may correspond to a level of interest. For example, the plurality of lists of entities may comprise a third list of entities, generated based upon location information, email activity, search activity, content accessed by the first client device, user settings messages, etc. which may correspond to a first level of interest. Alternatively and/or additionally, the plurality of lists of entities may comprise a fourth list of entities, generated based upon location information, email activity, search activity, content accessed by the first client device, user settings messages, etc. which may correspond to a second level of interest. For example, the first level of interest may be different than the second level of interest.

In an example, the first level of interest corresponding to the third list of entities may be higher than the second level of interest corresponding to the second list of entities. Alternatively and/or additionally, a first level of activity associated with a sixth entity may be higher than a second level of activity associated with a seventh entity. For example, the sixth entity may be added to the third list of entities and/or the seventh entity may be added to the second list of entities.

In some examples, the first user profile may be indicative of first locations associated with the first email account (e.g., locations that the first user may visit, may live, may work, etc.). For example, the first locations may be determined based upon geolocation information associated with the first client device (e.g., satellite navigation information associated with the first client device), email activity, search activity, etc. For example, the first user profile may comprise an indication of a home location associated with the first email account (e.g., where the first user may live). For example, the home location may be determined based upon location information associated with the first email account. Alternatively and/or additionally, the first user profile may comprise an indication of a work location associated with the first email account (e.g., where the first user may work).

Alternatively and/or additionally, the first user profile may comprise a list of past locations associated with the first user. For example, the list of past locations may be indicative of properties and/or addresses that the first user visited. Alternatively and/or additionally, the list of past locations may be indicative of cities, states and/or countries that the first user has visited. For example, the list of past locations may be generated based upon locations of the first client device (e.g., and/or one or more other client devices associated with the first email account). Alternatively and/or additionally, the list of past locations may be generated based upon email activity associated with the first email account. For example, a first location may be added to the list of past locations responsive to identifying an email comprising a hotel reservation confirmation, a flight reservation confirmation, etc. associated with a trip of the first user to the first location. Alternatively and/or additionally, a time indicative of a time period that the first user was at the first location may be added to the first user profile.

Alternatively and/or additionally, the first user profile may comprise a list of future locations associated with the first user. For example, the list of future locations may be indicative of locations that are determined to be likely visited by the user in the future. For example, the list of past locations may be analyzed to generated the list of future locations. For example, it may be determined that the first user has visited a second location (e.g., Miami, Fla.) during a second period of time (e.g., during the month of November). Responsive to identifying a pattern (e.g., that the first user has visited the Miami, Fla. during the month of November more than one time), the second location may be added to the list of future locations and/or an indication of the second period of time (e.g., the month of November) may be added to the first user profile.

Alternatively and/or additionally, the list of future locations may be generated based upon email activity associated with the first email account. For example, the second location may be added to the list of future locations responsive to identifying an email comprising a hotel reservation confirmation, a flight reservation confirmation, etc. associated with the second location (e.g., Miami, Fla.). Alternatively and/or additionally, the list of future locations may be generated based upon search activity associated with the first email account. For example, a query (e.g., "tickets to Miami in November") used to perform a search may be identified. For example, the query may be analyzed to determine that the first user is likely planning a trip to the second location during the second period of time. The second location may be added to the list of future locations and/or an indication of the second period of time (e.g., the month of November) may be added to the first user profile responsive to identifying the query.

Alternatively and/or additionally, the first locations associated with the first email account may be determined based upon one or more settings messages received from the first client device (and/or a different client device associated with the first email account). For example, the one or more user settings messages may be received via the settings interface. For example, the settings interface may comprise selectable inputs corresponding to the home location, the work location, the list of past locations and/or the list of future locations associated with the first email account. For example, the home location, the work location, the list of past locations and/or the list of future locations associated with the first email account may be determined based upon the one or more settings messages received via the settings interface.

Alternatively and/or additionally, the first user profile may be indicative of first topics associated with the first email account (e.g., topics and/or subject matter that the user may be interested in and/or topics and/or subject matter that the user may not be interested in). For example, the first user profile may comprise a first list of topics indicative of topics of the plurality of topics that the first user may have an interest in. For example, the first list of topics may be generated based upon the first entities associated with the first email account. For example, topics associated with the first entities (e.g., entities of the first list of entities and/or entities of the plurality of lists of entities) may be determined and/or added to the first list of topics.

Alternatively and/or additionally, the first list of topics may be generated based upon email activity associated with the first email account. For example, one or more topics may be added to the first list of topics responsive to a determination that one or more emails received and/or transmitted by the first email account is associated with the one or more topics. Alternatively and/or additionally, the first list of topics may be generated based upon search activity. For example, one or more topics may be added to the first list of topics responsive to a determination that one or more queries used to perform searches on the first client device and/or a different client device associated with the first email account comprise indications of the one or more topics. Alternatively and/or additionally, the first list of topics may be generated based upon content (e.g., web pages, content items such as videos, images, audio, social media posts, etc.) accessed by the first client device (and/or one or more client devices associated with the first email account).

Alternatively and/or additionally, the first list of topics may be generated based upon one or more user settings messages received from the first client device (and/or a different client device associated with the first email account). For example, the one or more user settings messages may be received via the settings interface. For example, the settings interface may comprise a topic list comprising the plurality of topics. For example, one or more topics may be added to the first list of topics responsive to selections of the one or more topics from the topic list.

Alternatively and/or additionally, the first user profile may comprise a second list of topics indicative of topics of the plurality of topics that the first user may not have an interest in. For example, the second list of topics may be generated based upon the second list of entities (e.g., indicative of entities of the plurality of entities that the first user may not have an interest in). For example, topics associated with entities of the second list of entities may be added to the second list of topics. Alternatively and/or additionally, the second list of topics may be generated based upon email activity associated with the first email account. For example, a topic may be added to the second list of topics responsive to a determination that a quantity and/or proportion of emails that are associated with the topic and received and/or transmitted by the first email account is less than a threshold quantity and/or proportion of emails. Alternatively and/or additionally, a topic may be added to the second list of topics responsive to a determination that a quantity and/or proportion of emails that are associated with the topic and selected and/or consumed using the email client is less than a threshold quantity and/or proportion of emails. Alternatively and/or additionally, the second list of topics may be generated based upon search activity. For example, a topic may be added to the second list of topics responsive to a determination that a quantity and/or proportion of queries used to perform searches that are associated with the topic is less than a threshold quantity and/or proportion of queries.

Alternatively and/or additionally, the second list of topics may be generated based upon one or more third user settings messages received from the first client device (and/or a different client device associated with the first email account). For example, the one or more third user settings messages may be received via the settings interface. For example, the settings interface may comprise a second topic list comprising the plurality of topics. For example, one or more topics may be added to the second list of topics responsive to selections of the one or more topics from the second topic list.

Alternatively and/or additionally, rather than maintaining the second list of topics, merely the first list of topics may be maintained. For example, rather than adding topics to the second list of topics based upon the second list of entities, email activity, search activity and/or user settings messages, the topics may be removed from the first list of topics based upon the second list of entities, email activity, search activity and/or user settings messages.

Alternatively and/or additionally, the first list of topics may be indicative of levels of interest associated with topics of the first list of topics. For example, the first list of topics may comprise indications of levels of interest associated with each topic of the first list of topics. In some examples, a level of interest may correspond to a level of activity associated with a topic (e.g., a level of email activity associated with a topic, a quantity and/or proportion of queries associated with the topic used to perform searches, a quantity and/or proportion of webpages associated with the topic that are accessed, etc.). Alternatively and/or additionally, a plurality of lists of topics may be generated where each list of topics of the plurality of lists of topics may correspond to a level of interest.

Alternatively and/or additionally, the first user profile may be indicative of first times associated with the first email account (e.g., times that the first user may prefer receiving emails and/or times that the first user is likely to select and/or interact with emails). The first times may be indicative of times of day (e.g., times of day may include early morning 3:00 AM-8:00 AM, morning 8:00 AM-11:00 AM, noon 11:00 AM-2:00 PM, afternoon 2:00 PM-5:00 PM, evening 5:00 PM-8:00 PM, night 8:00 PM-12:00 AM, late night 12:00 AM-3:00 AM, for example) that the first user is likely to interact with emails. Alternatively and/or additionally, the first times may be indicative of days of the week (e.g., Sunday, Monday, Tuesday, etc.) that the first user is likely to interact with emails. Alternatively and/or additionally, the first times may be indicative of times of the month (e.g., early in the month, middle of the month, late in the month) that the first user is likely to interact with emails.

In some examples, the first times may be determined based upon email activity associated with the first email account. For example, the email activity may be analyzed to determine peaks in interactions with emails associated with the first email account. The peaks may correspond to times with higher levels of interactions with emails. Alternatively and/or additionally, the peaks may correspond to times with higher levels of interactions with emails that are associated with products, services, entities, promotional content, etc. (and/or are not associated with work-related emails and/or social emails).

In an example, it may be determined based upon email activity that the first user interacts with emails that are associated with products, services, entities, promotional content, etc. (and/or are not associated with work-related emails) more frequently during a first time of day (e.g., morning 8:00 AM-11:00 AM) and/or during a first day of the week (e.g., Saturday). Thus, the first times of the first user profile may be indicative of the first time of day and/or the first day of the week.

Alternatively and/or additionally, the first times may be determined based upon one or more user settings messages received from the first client device (and/or a different client device associated with the first email account). For example, the one or more user settings messages may be received via the settings interface. For example, the settings interface may comprise a list of times (e.g., times of day, days of the week, etc.). The first times may be determined based upon selections from the list of times. Alternatively and/or additionally, the first times may be entered into one or more text areas of the settings interface.

At 402, a first email, associated with an eighth entity may be received from a second email account. For example, the eighth entity may be comprised within the plurality of entities associated with the content system and/or the information service. Alternatively and/or additionally, the second email account may be associated with the eighth entity (e.g., the eighth entity may use the second email account to transmit emails to the content system). In some examples, the information service and/or the content system may be associated with a third email account and/or a first email address (e.g., "deals@emailexample.com"). For example, the first email may be transmitted by the second email account to the third email account.

Alternatively and/or additionally, the first email comprise information associated with the eighth entity. For example, the first email may comprise product information, promotional content, service information, event information, etc. associated with the eighth entity. In an example, the eighth entity may be a store which may have an event (e.g., a sales event where discounted products are on sale at discounted prices). For example, the first email may comprise information associated with the event (e.g., content items, such as images and/or videos illustrating the discounted products, descriptions of the discounted prices, etc.).

Alternatively and/or additionally, the first email may comprise email location information associated with the first email. For example, the email location information may be indicative of one or more locations that the first email is associated with (e.g., one or more locations that the first email is relevant to). For example, if the eighth entity is a store located in Cleveland, Ohio, and/or if the first email is associated with products and/or services offered in Cleveland, Ohio, the email location information may be indicative of Cleveland, Ohio. Alternatively and/or additionally, the email location information may be indicative of one or more specific locations associated with the eighth entity (e.g., one or more location points associated with the eighth entity which may comprise longitude coordinates and/or latitude coordinates). For example, the one or more specific locations may comprise location points associated with the eight entity that are more accurate than the one or more locations. For example, the one or more locations may correspond to a neighborhood, a city, a state, a country, etc. associated with the eighth entity. For example, if the eighth entity is a store, the one or more specific locations may comprise location coordinates of a property in which the store is located. Alternatively and/or additionally, the first email may be analyzed to determine the email location information associated with the first email.

Alternatively and/or additionally, the first email may comprise expiration information associated with the first email. For example, the expiration information may be indicative of an expiration time associated with the first email (e.g., the first email may not be relevant after the expiration time). For example, the first email may be indicative of a sales event ending at the expiration time (e.g., Tuesday, Nov. 27, 2018). The expiration information may be indicative of the first email no longer being relevant after the expiration time (e.g., Tuesday, Nov. 27, 2018). Alternatively and/or additionally, the first email may be analyzed to determine the expiration information associated with the first email.

Alternatively and/or additionally, the first email may comprise topic information associated with the first email. For example, the topic information may be indicative of one or more topics associated with the first email. For example, if the first email is indicative of a clothing event where new clothes associated with the eighth entity are showcased, the topic information may be indicative of the tenth topic "clothing" and/or the third topic "shopping". Alternatively and/or additionally, the first email may be analyzed to determine the topic information associated with the first email.

Alternatively and/or additionally, rather than receiving the first email, a first file may be received. For example, a second client device associated with the eighth entity may be controlled to display a file upload interface associated with the content system. For example, the first file may be received responsive to the first file being uploaded via the file upload interface. The first file may comprise the product information, the promotional content, the service information, the event information, etc. associated with the eighth entity (e.g., the first file may comprise a representation of the first email).

Alternatively and/or additionally, the file upload interface may comprise selectable inputs and/or text areas associated with the email location information, the expiration information and/or the topic information. For example, the email location information, the expiration information and/or the topic information may be inputted via text areas of the file upload interface and/or selected via selectable inputs of the file upload interface.

At 404, an email account database comprising a plurality of user profiles may be analyzed based upon the first email (and/or the first file) to select a set of email accounts, from the plurality of email accounts subscribed to the information service, for transmission of a set of emails associated with the first email. Each user profile of the plurality of user profiles may comprise information corresponding to an email account of the plurality of email accounts.

In some examples, the set of email accounts may be selected based upon the eighth entity associated with the first email. For example, the set of email accounts may be selected responsive to a determination that a user profile corresponding to each email account of the set of email accounts is associated with the eighth entity. For example, the first email account may be included in the set of email accounts by analyzing the first user profile (associated with the first email account) based upon the eighth entity. For example, the first email account may be included in the set of email accounts based upon a determination that the eighth entity is comprised within the first list of entities of the first user profile (indicative of entities of the plurality of entities that the first user may have an interest in). Alternatively and/or additionally, the first email account may be included in the set of email accounts based upon a determination that the eighth entity is not comprised within the second list of entities (indicative of entities of the plurality of entities that the first user may not have an interest in). Alternatively and/or additionally, the first email account may not be included in the set of email accounts based upon a determination that the eighth entity is comprised within the second list of entities.

Alternatively and/or additionally, the first email account may be included in the set of email accounts based upon a determination that a level of activity associated with the eighth entity is higher than a level of activity threshold and/or that a level of interest associated with the eighth entity is higher than a level of interest threshold. For example, the first email account may be included in the set of email accounts based upon a determination that the eighth entity is comprised within the plurality of lists of entities (e.g., the third list of entities and/or the fourth list of entities of the first user profile). For example, the first email account may be included in the set of email accounts based upon a determination that the eighth entity is comprised within a list of entities, of the plurality of lists of entities, associated with a level of activity higher than the level of activity threshold and/or associated with a level of interest higher than the level of interest threshold.

For example, the first email account may be included in the set of email accounts based upon a determination that the eighth entity is comprised within the third list of entities (e.g., the first level of interest associated with the third list of entities may be higher than the level of interest threshold and/or the first level of activity associated with the third list of entities may be higher than the level of activity threshold). However, the first email account may not be included in the set of email accounts based upon a determination that the eighth entity is comprised within the fourth list of entities (e.g., the second level of interest associated with the fourth list of entities may be lower than the level of interest threshold and/or the second level of activity associated with the fourth list of entities may be lower than the level of activity threshold).

In some examples, the set of email accounts may be selected based upon the email location information associated with the first email. For example, the set of email accounts may be selected responsive to a determination that a user profile corresponding to each email account of the set of email accounts is indicative of a location associated with the email location information. For example, the email location information may be associated with one or more second locations (e.g., products and/or services may be offered in the one or more second locations, such as Cleveland, Ohio, Erie, Pa., etc.) and/or the one or more specific locations (e.g., more accurate location points associated with the eight entity). For example, the set of email accounts may be selected responsive to a determination that a user profile corresponding to each email account of the set of email accounts is indicative of a location associated with the one or more second locations (e.g., within a threshold distance from a location of the one or more second locations) and/or the one or more specific locations (e.g., within a threshold distance from a specific location of the one or more specific locations).

For example, the first email account may be included in the set of email accounts by analyzing the first user profile (associated with the first email account) based upon the email location information, the one or more second locations and/or the one or more specific locations. For example, the first email account may be included in the set of email accounts responsive to a determination that the first locations of the first user profile comprise a location of the one or more second locations of the email location information (and/or a determination that the first locations comprise a location within a threshold distance from a location of the one or more second locations of the email location information). Alternatively and/or additionally, the first email account may be included in the set of email accounts responsive to a determination that the first locations of the first user profile comprise a specific location of the one or more specific locations of the email location information (and/or a determination that the first locations comprise a location within a threshold distance from a specific location of the one or more specific locations).

Alternatively and/or additionally, the first email account may be included in the set of email accounts responsive to a determination that a current location of the first user and/or the first client device (e.g., determined based upon geolocation information associated with the first client device) matches a location of the one or more second locations and/or is within a threshold distance from a location of the one or more second locations. Alternatively and/or additionally, the first email account may be included in the set of email accounts responsive to a determination that the current location of the first user and/or the first client device matches a specific location of the one or more specific locations and/or is within a threshold distance from a specific location of the one or more specific locations.

Alternatively and/or additionally, the first email account may be included in the set of email accounts responsive to a determination that the list of past locations (of the first user profile) comprises a location of the one or more second locations (and/or that the list of past locations comprises a location within a threshold distance from a location of the one or more second locations) and/or that the list of past locations comprises a specific location of the one or more specific locations (and/or that the list of past locations comprises a location within a threshold distance from a specific location of the one or more specific locations). Alternatively and/or additionally, the first email account may be included in the set of email accounts responsive to a determination that the list of future locations (of the first user profile) comprises a location of the one or more second locations (and/or that the list of future locations comprises a location within a threshold distance from a location of the one or more second locations). Alternatively and/or additionally, the first email account may be included in the set of email accounts responsive to a determination that the home location and/or the work location are within a threshold distance from a location of the one or more second locations and/or that the home location and/or the work location are within a threshold distance from a specific location of the one or more specific locations.

In some examples, the set of email accounts may be selected based upon the topic information associated with the first email. For example, the set of email accounts may be selected responsive to a determination that a user profile corresponding to each email account of the set of email accounts is indicative of a topic associated with the topic information. For example, the topic information may be associated with one or more second topics. For example, the set of email accounts may be selected responsive to a determination that a user profile corresponding to each email account of the set of email accounts is indicative of a topic of the one or more second topics.

For example, the first email account may be included in the set of email accounts by analyzing the first user profile (associated with the first email account) based upon the topic information and/or the one or more second topics. For example, the first email account may be included in the set of email accounts responsive to a determination that the first topics of the first user profile comprise a topic of the one or more second topics. Alternatively and/or additionally, the first email account may be included in the set of email accounts based upon a determination that a topic of the one or more second topics is comprised within the first list of topics associated with the first user profile (indicative of topics of the plurality of topics that the first user may have an interest in). Alternatively and/or additionally, the first email account may be included in the set of email accounts based upon a determination that a topic of the one or more second topics is not comprised within the second list of topics (indicative of topics of the plurality of topics that the first user may not have an interest in). Alternatively and/or additionally, the first email account may not be included in the set of email accounts based upon a determination that a topic of the one or more second topics (and/or every topic of the one or more second topics, and/or a threshold number of topics of the one or more second topics) is comprised within the second list of topics.

Alternatively and/or additionally, the first email account may be included in the set of email accounts based upon a determination that a level of activity associated with a topic of the one or more second topics is higher than a level of activity threshold and/or that a level of interest associated with a topic of the one or more second topics is higher than a level of interest threshold. For example, the first email account may be included in the set of email accounts based upon a determination that a topic of the one or more second topics is comprised within the plurality of lists of topics. For example, the first email account may be included in the set of email accounts based upon a determination that a topic of the one or more second topics is comprised within a list of topics, of the plurality of lists of topics, associated with a level of activity higher than the level of activity threshold and/or associated with a level of interest higher than the level of interest threshold.

Alternatively and/or additionally, the one or more second topics may be analyzed to determine a type of user associated with the one or more second topics. For example, the one or more second topics may be determined to be associated with a first type of user that is on vacation and/or on a trip (e.g., a tourist on a trip). Alternatively and/or additionally, the one or more second topics may be determined to be associated with a second type of user that is not on a trip (e.g., a resident).

In an example, it may be determined that the one or more second topics are associated with the first type of user (e.g., the one or more second topics may be associated with travel, tourist attractions, car rentals, etc.). For example, the set of email accounts may be selected responsive to a determination that a user profile corresponding to each email account of the set of email accounts is indicative of a location associated with the one or more second locations and/or that the location is different than where a corresponding user resides and/or works.

In a second example, it may be determined that the one or more second topics are associated with the second type of user (e.g., the one or more second topics may be associated with home improvement, kitchen appliances, etc.). For example, the set of email accounts may be selected responsive to a determination that a user profile corresponding to each email account of the set of email accounts is indicative of a location associated with the one or more second locations and/or that the location is determined to be where a corresponding user resides and/or works.

Alternatively and/or additionally, the set of email accounts may be selected based upon the expiration information associated with the first email. For example, the set of email accounts may be selected responsive to a determination that a user profile corresponding to each email account of the set of email accounts is indicative of a corresponding user being at a location associated with the email location information before the expiration time. For example, the set of email accounts may be selected responsive to a determination that a user profile corresponding to each email account of the set of email accounts is indicative of a corresponding user being at a location of the one or more second locations (and/or within a threshold distance from a location of the one or more second locations) before the expiration time.

For example, the first email account may be included in the set of email accounts by analyzing the first user profile (associated with the first email account) based upon the one or more second locations and/or the expiration time. For example, the first email account may be included in the set of email accounts responsive to a determination that the list of future locations comprises a location of the one or more second locations and/or that a start time of a period of time associated with the location is before the expiration time.

At 406, the set of emails may be transmitted to the set of email accounts. For example, each email of the set of emails may be transmitted to an email account of the set of email accounts. In some examples, each email of the set of emails may be generated based upon the first email (and/or the first file). For example, emails of the set of emails may be the same as (e.g., identical to and/or similar to) the first email (and/or the first file) (e.g., content of emails of the set of emails may be the same as content of the first email).

Alternatively and/or additionally, emails of the set of emails may be different than the first email (and/or the first file). For examples, the first email may be modified to generate emails of the set of emails. For example, the first email may be summarized and/or shortened to generate emails of the set of emails. Alternatively and/or additionally, the first email may be modified, based upon user profiles associated with the set of email accounts to generate emails of the set of emails.

In some examples, the first email account may be associated with a second set of emails comprising the first email. For example, the second set of emails may be selected for transmission to the first email account. Alternatively and/or additionally, the second set of emails may be combined into a third email of the set of emails. For example, one or more emails of the second set of emails may be modified (e.g., summarized, shortened, etc.) into a second set of modified emails. The second set of modified emails may be combined into the third email (e.g., the third email may comprise representations of the second set of modified emails). Alternatively and/or additionally, the third email may be the same as (e.g., identical to and/or similar to) the first email. The third email may be transmitted to the first email account.

In some examples, transmission of the set of emails may be controlled based upon user profiles associated with the set of email accounts. For example, an email of the set of emails may be transmitted to an email account of the set of email accounts during a time of day and/or a day of the week associated with the email account. For example, transmission of the third email (to the first email account) may be controlled based upon the first user profile. For example, the transmission of the third email may be controlled based upon the first times associated with the first email account. For example, the third email may be transmitted during a time of day and/or a day of the week associated with the first email account.

Alternatively and/or additionally, time of day information and/or day of the week information may be unavailable for one or more email accounts of the set of email accounts. For example, transmission of one or more emails of the set of emails to the one or more email accounts may be controlled based upon timing information associated with the content system (where the timing information may be designed to accommodate typical user behavior). For example, transmission of emails of the set of emails may be controlled such that the emails are not transmitted during unsuitable times of day (e.g., such as late night 12:00 AM-3:00 AM and/or early morning 3:00 AM-8:00 AM, for example) and/or are transmitted during suitable times of day (e.g., such as morning 8:00 AM-11:00 AM, noon 11:00 AM-2:00 PM, afternoon 2:00 PM-5:00 PM and/or evening 5:00 PM-8:00 PM, for example). Alternatively and/or additionally, suitable times of day and/or unsuitable times of day may vary between seasons (e.g., suitable times of day and/or unsuitable times of day during summer may be different than suitable times of day and/or unsuitable times of day during winter as a result of differences in amounts of daylight between seasons and/or differences in work-schedules between seasons).

Alternatively and/or additionally, transmission of emails of the set of emails may be controlled such that the emails are not transmitted during unsuitable days of the week (e.g., such as Monday and/or Tuesday, for example) and/or are transmitted during suitable days of the week (e.g., such as Thursday, Friday and/or Saturday, for example). Alternatively and/or additionally, suitable days of the week and/or unsuitable days of the week may vary between seasons (e.g., suitable days of the week and/or unsuitable days of the week during summer may be different than suitable days of the week and/or unsuitable days of the week during winter).

In some examples, transmission of the set of emails may be controlled based upon locations associated with the set of email accounts. For example, an email of the set of emails may be transmitted to an email account of the set of email accounts while a corresponding user is at a location of the one or more second locations (associated with the eighth entity), within a threshold distance from a location of the one or more second locations, and/or en route to a location of the one or more second locations. Alternatively and/or additionally, an email of the set of emails may be transmitted to an email account of the set of email accounts while a corresponding user is at a specific location of the one or more specific locations (associated with the eighth entity), within a threshold distance from a specific location of the one or more specific locations and/or en route to a specific location of the one or more specific locations. For example, an email of the set of email may be transmitted to an email account of the set of email accounts while a corresponding user is visiting the eighth entity.

For example, the transmission of the third email (to the first email account) may be controlled based upon the list of future locations. For example, the third email may be transmitted a duration of time (e.g., one day, one week, one month, etc.) prior to a time period that the first user is determined to be at a location of the one or more second locations and/or within a threshold distance from a location of the one or more second locations. Alternatively and/or additionally, the transmission of the third email may be controlled based upon the current location of the first user and/or the first client device (e.g., determined based upon geolocation information associated with the first client device).

For example, the third email may be transmitted to the first email account responsive to determining that the first user and/or the first client device are located at a location of the one or more second locations and/or that the first user and/or the first client device is within a threshold distance from a location of the one or more second locations. Alternatively and/or additionally, the third email may be transmitted to the first email account responsive to determining that the first user and/or the first client device are en route to a location of the one or more second locations (e.g., which may be determined based upon the current location of the first user and/or the first client device, and/or which may be determined based upon a request for navigational directions to a location of the one or more second locations received from the first client device).

Alternatively and/or additionally, the third email may be transmitted to the first email account responsive to determining that the first user and/or the first client device are located at a specific location of the one or more specific locations (e.g., which may indicate that the first user is visiting the eighth entity) and/or that the first user and/or the first client device are within a threshold distance from a specific location of the one or more specific locations. Alternatively and/or additionally, the third email may be transmitted to the first email account responsive to determining that the first user and/or the first client device are en route to a specific location of the one or more specific locations.

Alternatively and/or additionally, transmission of the set of emails may be controlled based upon the expiration information associated with the first email. For example, emails of the set of emails may be transmitted before the expiration time. Alternatively and/or additionally, emails of the set of emails may be transmitted a duration of time (e.g., one day, one week, one month, etc.) before the expiration time.

In some examples, a rate of transmission of emails (e.g., a quantity of emails transmitted to an email account per unit of time, such as day, week, month, etc.) may be controlled such that the rate of transmission of emails does not exceed a threshold rate of transmission (e.g., 5 emails per week, 10 emails per week, 40 emails per month, etc.). For example, if a third set of emails are selected for transmission to the first email account during a third period of time and/or if transmitting the third set of emails during the third period of time would result in a first rate of transmission of emails to the first email account to exceed the threshold rate of transmission, then one or more emails of the third set of emails may be discarded and/or transmission of the one or more emails of the third set of emails may be postponed until after the first period of time.

For example, the one or more emails of the third set of emails may be selected for being discarded and/or postponed based upon a determination that one or more entities associated with the one or more emails of the third set of emails are associated with lower levels of interest and/or lower levels of activity than other entities associated with other emails of the third set of emails (e.g., which may be determined by comparing entities associated with the third set of emails with the plurality of lists of entities of the user profile). Alternatively and/or additionally, the one or more emails of the third set of emails may be selected for being discarded and/or postponed based upon a determination that one or more topics associated with the one or more emails of the third set of emails are associated with lower levels of interest and/or lower levels of activity than other topics associated with other emails of the third set of emails.

Alternatively and/or additionally, a second rate of transmission of emails associated with a single entity (e.g., a quantity of emails transmitted to an email account per unit of time, such as day, week, month, etc., wherein the emails are associated with the single entity) may be controlled such that the second rate of transmissions associated with the single entity does not exceed a second threshold rate of transmission (e.g., 2 emails per week, 5 emails per week, 20 emails per month, etc.).

In some examples, activity associated with the set of emails may be monitored. For example, it may be determined whether emails of the set of emails are selected, consumed, forwarded and/or interacted with. For example, the activity associated with the set of emails may be used to modify user profiles associated with the set of email accounts. For example, first activity associated with the first email account and/or the third email may be monitored. The first activity may comprise selections and/or interactions with a first plurality of emails, transmitted to the first email account, associated with the eighth entity. For example, responsive to a determination that a level of activity of the first activity (e.g., a quantity of selections, a quantity of interactions, etc.) is less than a first level of activity threshold, emails associated with the eighth entity may not be transmitted to the first email account (and/or transmissions of emails associated with the eighth entity to the first email account may be decreased). Alternatively and/or additionally, the eighth entity may be removed from the first list of entities of the first user profile associated with entities that the first user may have an interest in, the eighth entity may be added to the second list of entities indicative of entities that the first user may not have an interest in, etc.

Alternatively and/or additionally, second activity associated with the first email account and/or the third email may be monitored. The second activity may comprise selections and/or interactions with a second plurality of emails, transmitted to the first email account, associated with the one or more second topics. For example, responsive to a determination that a level of activity of the second activity (e.g., a quantity of selections, a quantity of interactions, etc.) is less than a second level of activity threshold, emails associated with the one or more second topics may not be transmitted to the first email account (and/or transmissions of emails associated with the one or more second topics to the first email account may be decreased). Alternatively and/or additionally, one or more topics of the one or more second topics may be removed from the first list of topics of the first user profile associated with topics that the first user may have an interest in, one or more topics of the one or more second topics may be added to the second list of topics indicative of topics that the first user may not have an interest in, etc.

Alternatively and/or additionally, third activity associated with the first email account and/or the third email may be monitored. The third activity may comprise selections and/or interactions with a third plurality of emails, transmitted to the first email account, associated with the one or more second locations. For example, responsive to a determination that a level of activity of the third activity (e.g., a quantity of selections, a quantity of interactions, etc.) is less than a third level of activity threshold, emails associated with the one or more second locations may not be transmitted to the first email account (and/or a transmissions of emails associated with the one or more second locations to the first email account may be decreased).

Alternatively and/or additionally, the third email may comprise a first selectable input (e.g., "This is interesting to me") corresponding to the first user having an interest in the third email and/or a second selectable input (e.g., "This is not interesting to me") corresponding to the first user not having an interest in the third email. For example, responsive to receiving a selection of the first selectable input, the first user profile may be modified based upon the selection of the first selectable input (e.g., the eighth entity may be added to the first list of entities, the one or more second topics may be added to the first list of topics, transmissions of emails associated with the eighth entity to the first email account may be increased, transmissions of emails associated with the one or more second topics to the first email account may be increased, etc.).

Alternatively and/or additionally, responsive to receiving a selection of the second selectable input, the first user profile may be modified based upon the selection of the second selectable input (e.g., the eighth entity may be removed from the first list of entities, the eighth entity may be added to the second list of entities, transmissions of emails associated with the eighth entity to the first email account may be decreased, the one or more second topics may be removed from the first list of topics, the one or more second topics may be added to the second list of topics, transmissions of emails associated with the one or more second topics to the first email account may be decreased, etc.).

Alternatively and/or additionally, the first email account may be associated with a fourth set of emails, comprising the first email. In some examples, the fourth set of emails may be associated with related products and/or services (e.g., the fourth set of emails may comprise product information associated with laptops, the fourth set of emails may comprise product information associated with car maintenance services). Alternatively and/or additionally, each email of the fourth set of emails may be associated with a single product and/or a single service (e.g., each email of the fourth set of emails may correspond to a sales event associated with a laptop model and/or each email of the fourth set of emails may correspond to oil change service).

In some examples, the fourth set of emails may be analyzed to select a recommended email from the fourth set of emails. For example, the recommended email may be selected from the fourth set of emails based upon a determination that the recommended email is associated with a monetary gain that is greater than monetary gains associated with other emails of the fourth set of emails (e.g., the recommended email may be associated with a highest discount on a product and/or a service compared with other emails of the fourth set of emails, the recommended email may be associated with a lowest price of a product and/or a service compared with other emails of the fourth set of emails, etc.).

Alternatively and/or additionally, the recommended email may be selected from the fourth set of emails based upon a determination that the recommended email is more suitable for the first user compared with other emails of the fourth set of emails (e.g., the recommended email may offer flights during the day whereas other emails of the fourth set of emails may offer flights during the night and/or it may be determined that the first user prefers flights during the day, which may be determined based upon flight confirmation emails transmitted to the first email account).

In some examples, merely the recommended email (and/or a representation of the recommended email) may be transmitted to the first email account and/or other emails of the fourth set of emails (and/or representations of the other emails) may not be transmitted to the first email account. Alternatively and/or additionally, representations of emails of the fourth set of emails may be transmitted to the first email account comprising an indication that the recommended email is associated with a monetary gain that is greater than the monetary gains of other emails of the fourth set of emails and/or an indication that the recommended email offers products and/or services that are more suitable for the first user compared with other emails of the fourth set of emails.

In some examples, one or more entities associated with the information service and/or the content system may receive compensation from entities of the plurality of entities as a result of transmitting emails associated with the plurality of entities to the plurality of email accounts. For example, compensation from an entity for transmitting emails to the plurality of email accounts may be determined based upon a quantity of emails associated with the entity that are transmitted, a quantity of email accounts receiving emails associated with the entity, etc.

It may be appreciated that one or more of the techniques presented herein may result in better monetizing opportunities, as a result of emails being transmitted to email accounts associated with users that are interested in topics and/or emails associated with the emails, as a result of location information associated with the email accounts being leveraged to target them with appropriate emails and/or content, as a result of controlling transmission of the emails based upon times of day and/or days of the week associated with the email accounts, which may result in higher interactions with the emails and/or higher conversion rates, etc. Alternatively and/or additionally, discounts for products and/or services may be offered merely for email accounts subscribed to the information service (and/or a different information service of the plurality of information services). Alternatively and/or additionally, users of the email client may be offered incentives to subscribe to the information service (and/or a different information service of the plurality of information services). For example, users of the email client may have an option to use the email client without advertisements (e.g., ad-free) responsive to subscribing to the information service (and/or a different information service of the plurality of information services).

It may be appreciated that one or more of the techniques presented herein may be implemented using a communication platform different than an email platform (e.g., messaging platforms, browsers, social media platforms, etc.). For example, using one or more of the techniques presented herein, user profiles may be generated corresponding to user accounts of many types (e.g., browser user accounts, messaging user accounts, social media user accounts, etc.). Alternatively and/or additionally, rather than transmitting emails to email accounts, messages (that may or may not be emails) may be transmitted to client devices associated with the user accounts based upon received messages and/or files from entities of the plurality of entities and/or based upon user profiles generated based upon the user accounts.

FIGS. 5A-5F illustrate examples of a system 501 for selecting messages for transmission to client devices. A first entity, such as an electronics store, may be associated with a content system and/or an information service associated with the content system. For example, messages (e.g., files, emails, etc.) associated with the first entity may be received by the content system and/or the content system may transmit emails associated with the messages to email accounts subscribed to the information service. For example, the messages and/or the emails may comprise product information, promotional content, service information, event information, etc. associated with the first entity.

Figure 5A:
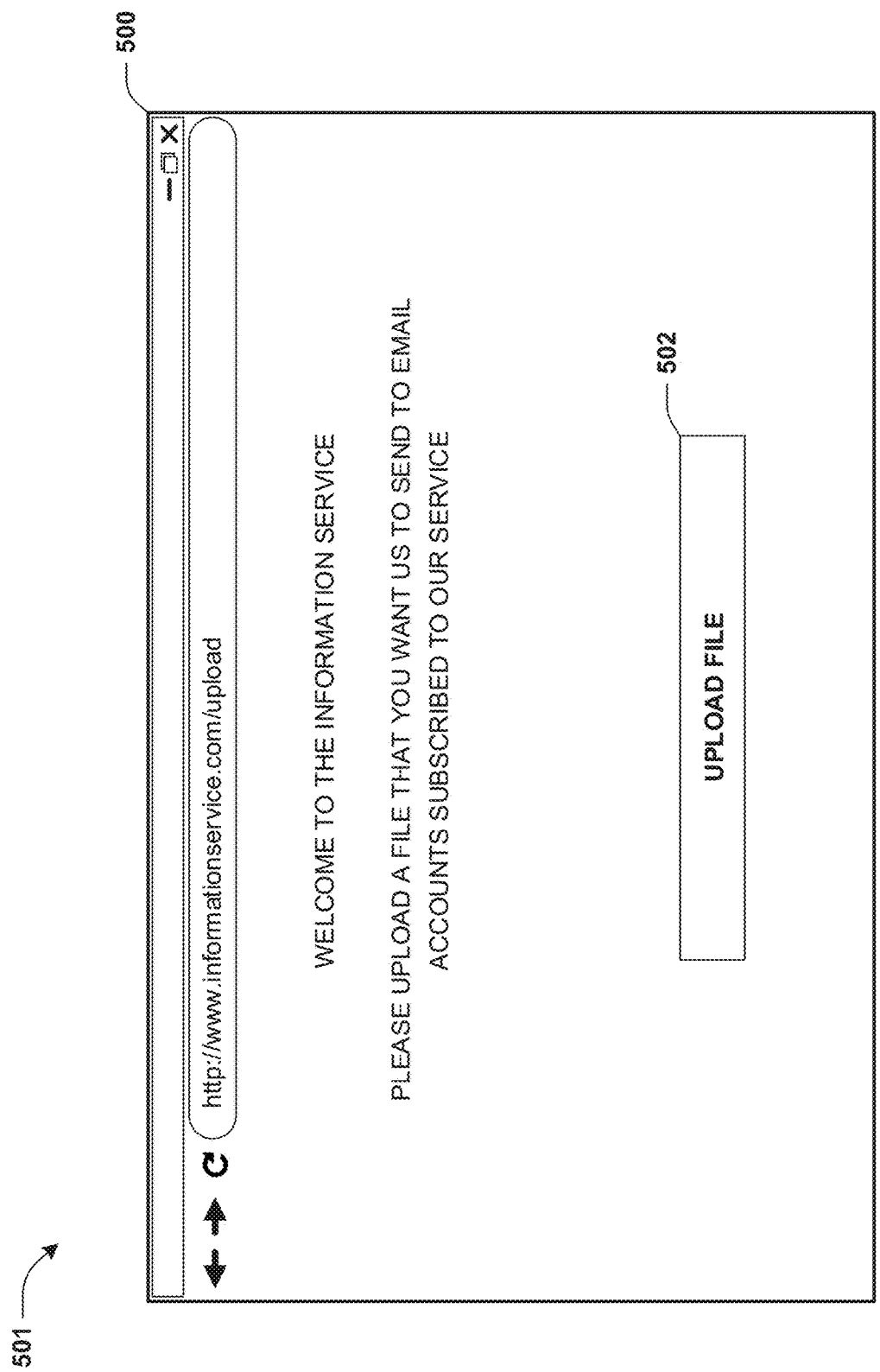
FIG. 5A is a component block diagram illustrating an example system for selecting messages for transmission to client devices, where a graphical user interface of a first client device is controlled to display a file upload interface associated with a content system.
Figure 5B:
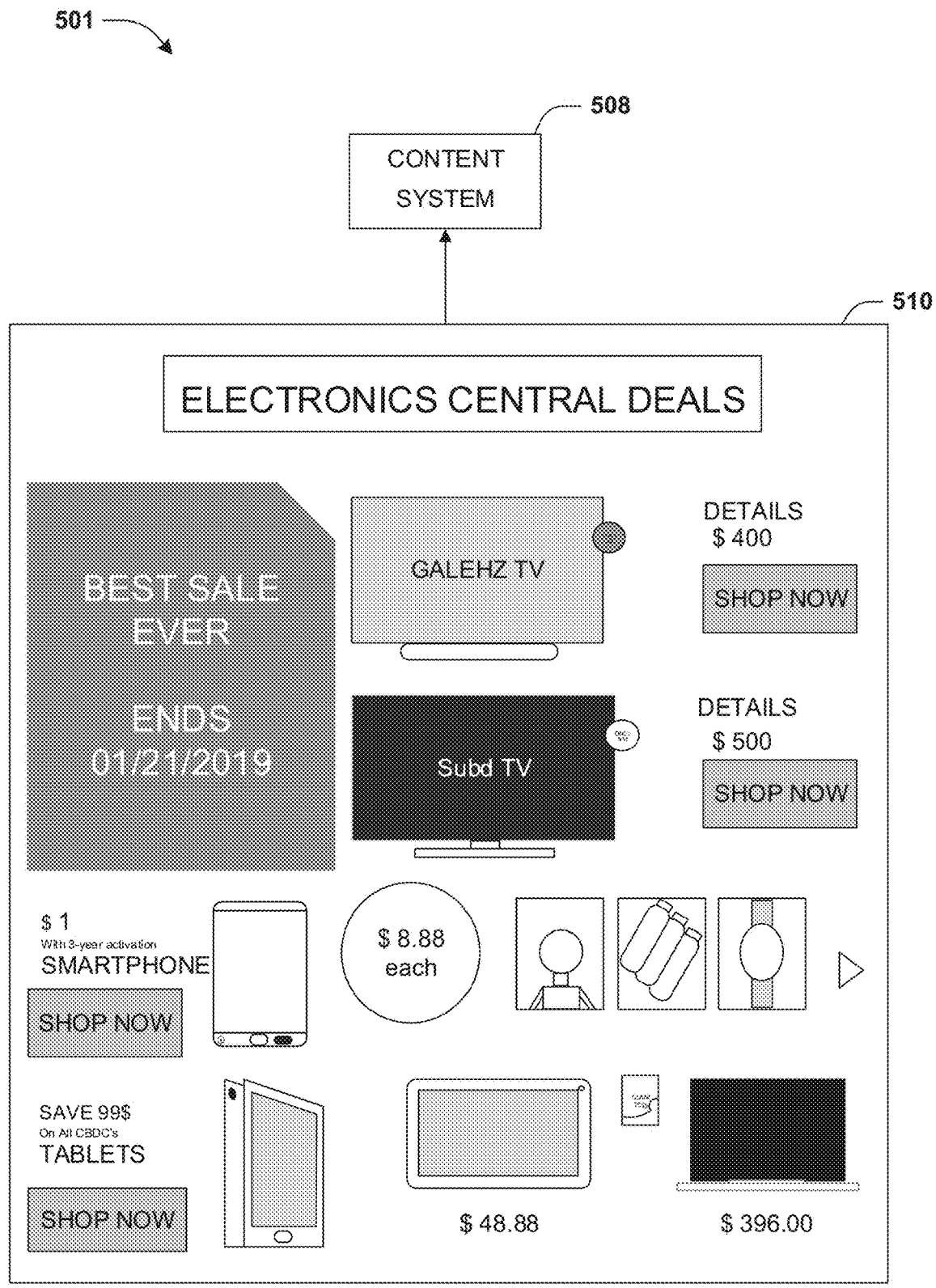
FIG. 5B is a component block diagram illustrating an example system for selecting messages for transmission to client devices, where a first file is uploaded to one or more servers.

FIG. 5A illustrates a graphical user interface of a first client device 500, associated with the first entity, being controlled to display a file upload interface associated with the content system and/or the information service. For example, the file upload interface may comprise a first selectable input 502 corresponding to uploading a first file 510 (illustrated in FIG. 5B) to one or more servers 508 (illustrated in FIG. 5B) associated with the content system. For example, responsive to a selection of the first selectable input 502, the first file 510 may be selected from files stored on the first client device 500 and/or may be uploaded to the one or more servers 508. FIG. 5B illustrates the first file 510 being uploaded to the one or more servers 508.

Figure 5C:
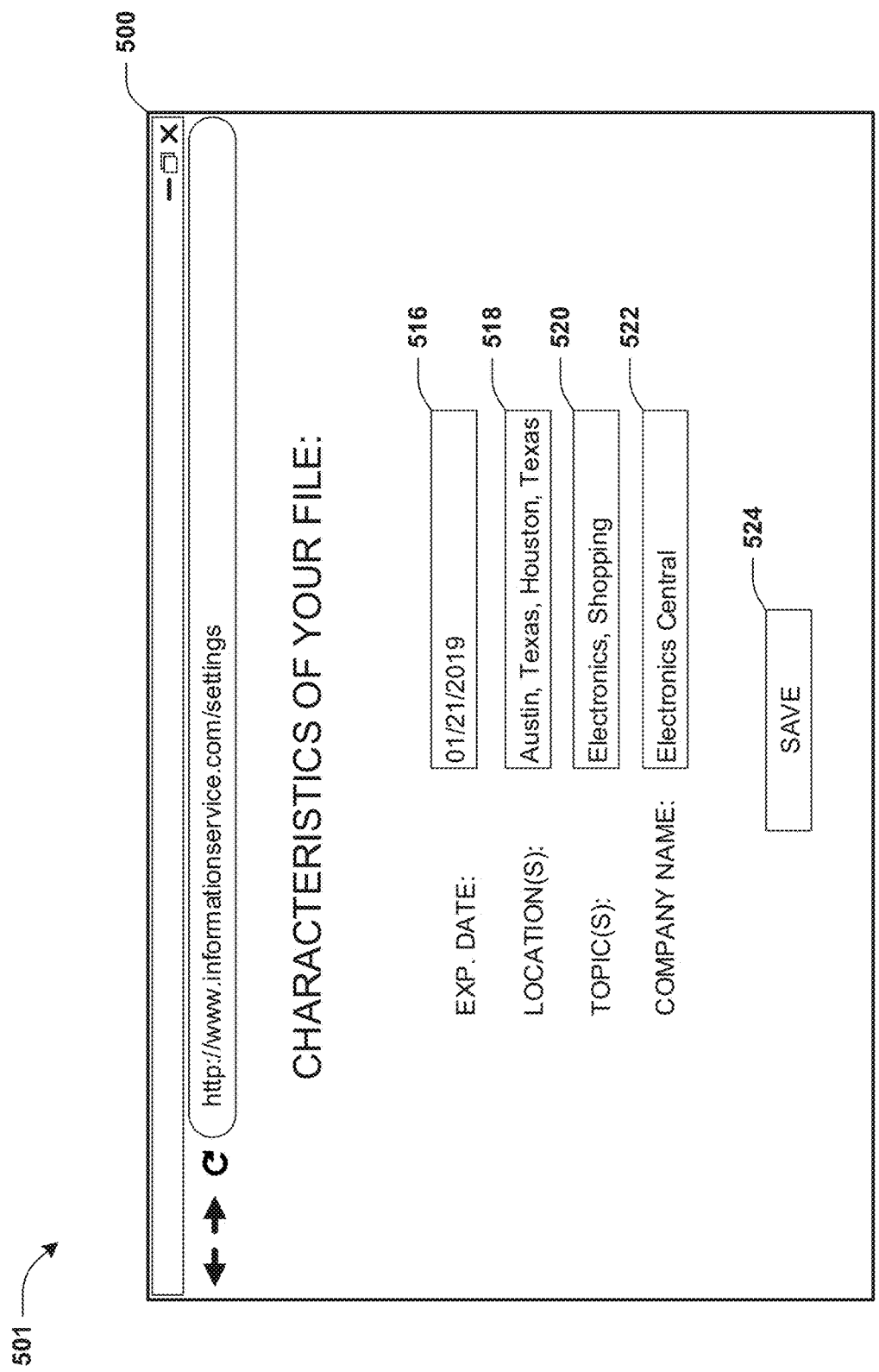
FIG. 5C is a component block diagram illustrating an example system for selecting messages for transmission to client devices, where a graphical user interface of a first client device is controlled to display a settings interface.

FIG. 5C illustrates the graphical user interface of the first client device 500 being controlled to display a settings interface. For example, the settings interface may comprise a plurality of text areas (and/or a plurality of selectable inputs) associated with the first file 510. For example, the settings interface may be displayed responsive to the first file 510 being uploaded to the one or more servers 508. Alternatively and/or additionally, the settings interface may be displayed prior to the first file 510 being uploaded to the one or more servers 508.

In some examples, the plurality of text areas may comprise a first text area 516 corresponding to expiration information associated with the first file 510. For example, an expiration time (e.g., Jan. 21, 2019) associated with the first file 510 may be entered into the first text area 516. Alternatively and/or additionally, the plurality of text areas may comprise a second text area 518 corresponding to location information associated with the first file 510. For example, a set of locations (e.g., a first location "Austin, Tex." and/or a second location "Houston, Tex.") may be entered into the second text area 518. Alternatively and/or additionally, the plurality of text areas may comprise a third text area 520 corresponding to topic information associated with the first file 510. For example, a set of topics (e.g., a first topic "electronics" and/or a second topic "shopping") may be entered into the third text area 520. Alternatively and/or additionally, the plurality of text areas may comprise a fourth text area 522 corresponding to entity information associated with the first entity. For example, a name of the first entity (e.g., "Electronics Central") may be entered into the fourth text area 520. In some examples, the settings interface may comprise a second selectable input 524 corresponding to storing the expiration information, the location information, the topic information and/or the entity information (in the one or more servers 508 associated with the content system).

Figure 5D:
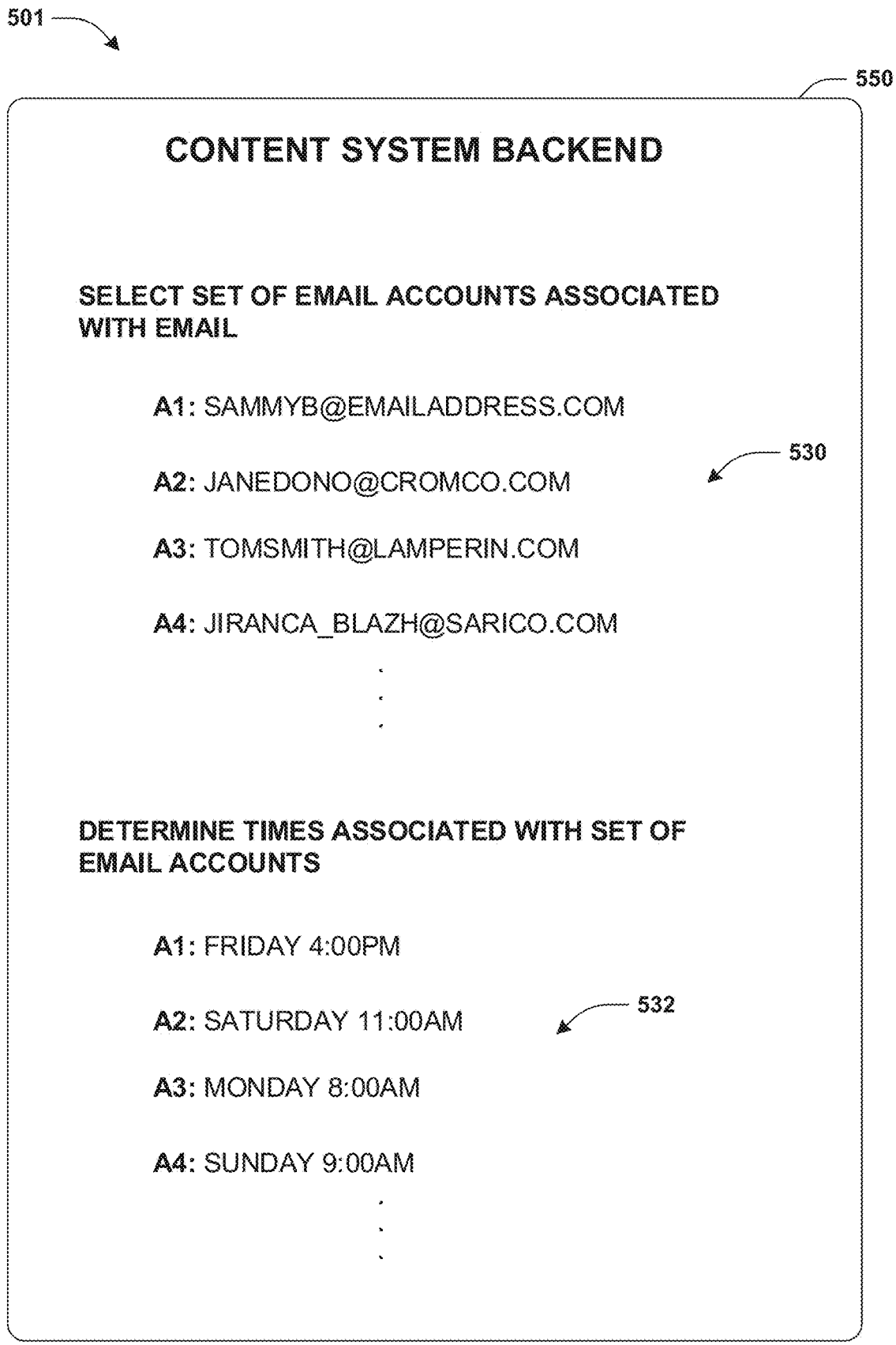
FIG. 5D is a component block diagram illustrating an example system for selecting messages for transmission to client devices, where a backend system selects a set of email accounts from a plurality of email accounts for transmission of a set of emails associated with a first file.

FIG. 5D illustrates a backend system 550 selecting a set of email accounts 530 from a plurality of email accounts for transmission of a set of emails associated with the first file 510. For example, the plurality of email accounts may be subscribed to the information service. In some examples, a plurality of user profiles corresponding to the plurality of email accounts may be stored in an email account database. For example, each user profile of the plurality of user profiles may correspond to an email account of the plurality of email accounts.

In some examples, the email account database and/or the plurality of user profiles may be analyzed based upon the first file 510, the expiration information, the location information, the topic information and/or the entity information to select the set of email accounts 530 for transmission of the set of emails. In some examples, the set of email accounts 530 may be selected based upon the first entity associated with the first file 510. For example, the set of email accounts 530 may be selected responsive to a determination that a user profile corresponding to each email account of the set of email accounts 530 is associated with the first entity.

Alternatively and/or additionally, the set of email accounts 530 may be selected based upon the location information associated with the first entity and/or the first file 510. For example, the set of email accounts 530 may be selected responsive to a determination that a user profile corresponding to each email account of the set of email accounts 530 is indicative of a location associated with the location information (e.g., within a threshold distance from the first location and/or the second location). Alternatively and/or additionally, the set of email accounts 530 may be selected based upon the topic information associated with the first entity and/or the first file 510. For example, the set of email accounts 530 may be selected responsive to a determination that a user profile corresponding to each email account of the set of email accounts 530 is indicative of a topic associated with the topic information (e.g., the first topic and/or the second topic).

In some examples, a set of times 532 associated with the set of email accounts 530 may be determined based upon user profiles associated with the set of email accounts 530. For example, each time of the set of times 532 may be associated with a time of day and/or a day of the week that a user associated with an email account of the set of email accounts may prefer receiving emails and/or times that the user is likely to select and/or interact with emails. For example, a first time of the set of times 532, associated with a first email account of the set of email accounts 530 may be associated with a first time of day (e.g., 4:00 PM) and/or a first day of the week (e.g., Friday). Alternatively and/or additionally, a second time of the set of times 532, associated with a second email account of the set of email accounts 530 may be associated with a second time of day (e.g., 11:00 AM) and/or a second day of the week (e.g., Saturday).

In some examples, the set of emails may be generated based upon the first file 510. For example, emails of the set of emails may comprise representations of the first file 510. In some examples, the set of emails may be transmitted to the set of email accounts 530. For example, transmission of the set of emails may be controlled based upon times of the set of times 532. For example, an email of the set of emails may be transmitted to an email account of the set of email accounts 530 during a time of the set of times associated with the email account. For example, a first email 538 (illustrated in FIG. 5E) of the set of emails may be transmitted to the first email account of the set of email accounts 532 during the first time of day (e.g., 4:00 PM) and/or during the first day of the week (e.g., Friday). Alternatively and/or additionally, the first email 538 of the set of emails may be transmitted to the first email account of the set of email accounts 532 responsive to a determination that a first user associated with the first email account and/or a second client device 575 (illustrated in FIG. 5E) associated with the first email account is at the first location and/or the second location and/or that the first user and/or the second client device 575 is within a threshold distance of the first location and/or the second location.

Figure 5E:
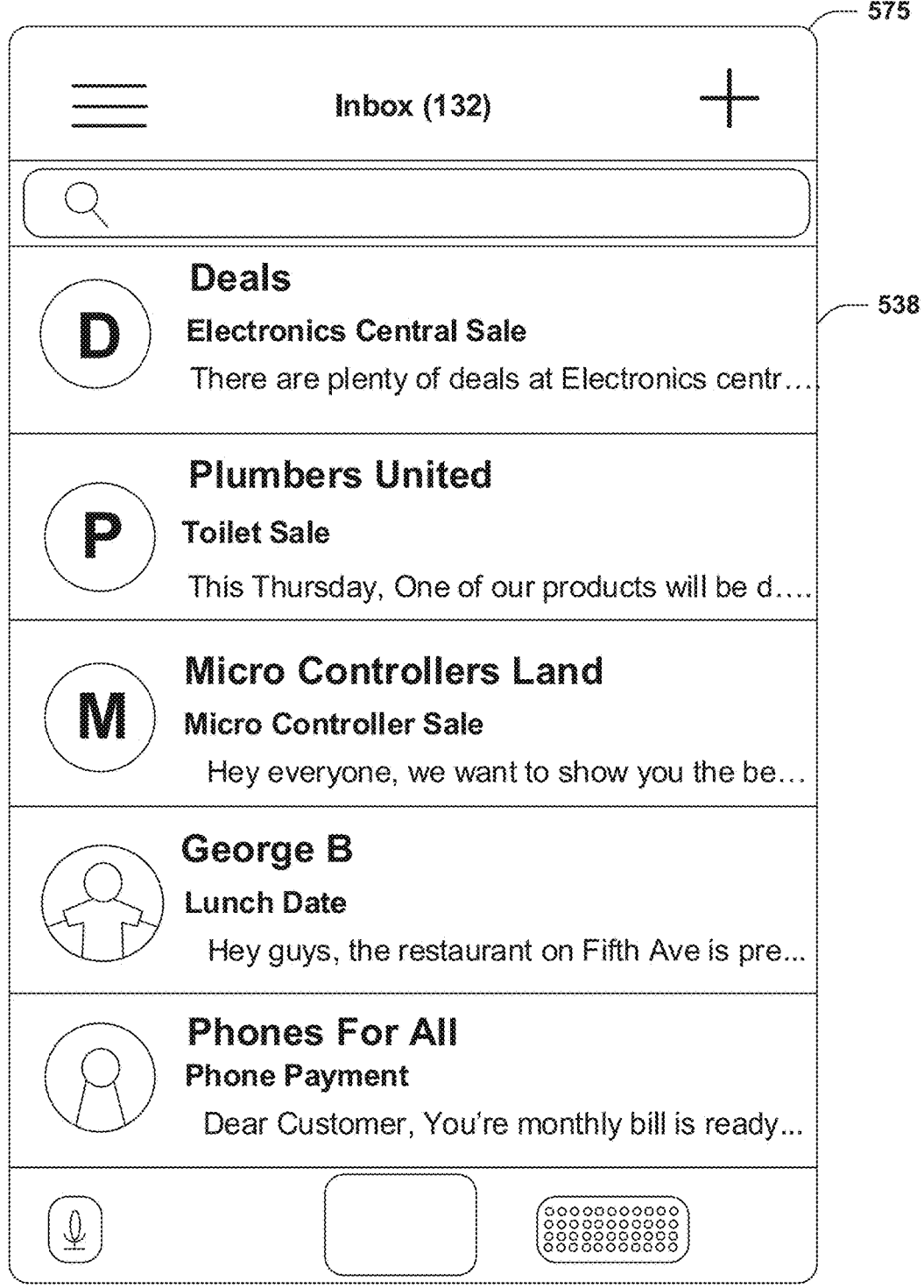
FIG. 5E is a component block diagram illustrating an example system for selecting messages for transmission to client devices, where a second graphical user interface of a second client device is controlled to display an email interface.

FIG. 5E illustrates a second graphical user interface of the second client device 575 being controlled to display an email interface. For example, the first email 538 may be received by the first email account. In some examples, the first email 538 may be transmitted by a third email account "deals@exampleemail.com" associated with the information service. A selection of the first email 538 may be received via the email interface.

Figure 5F:
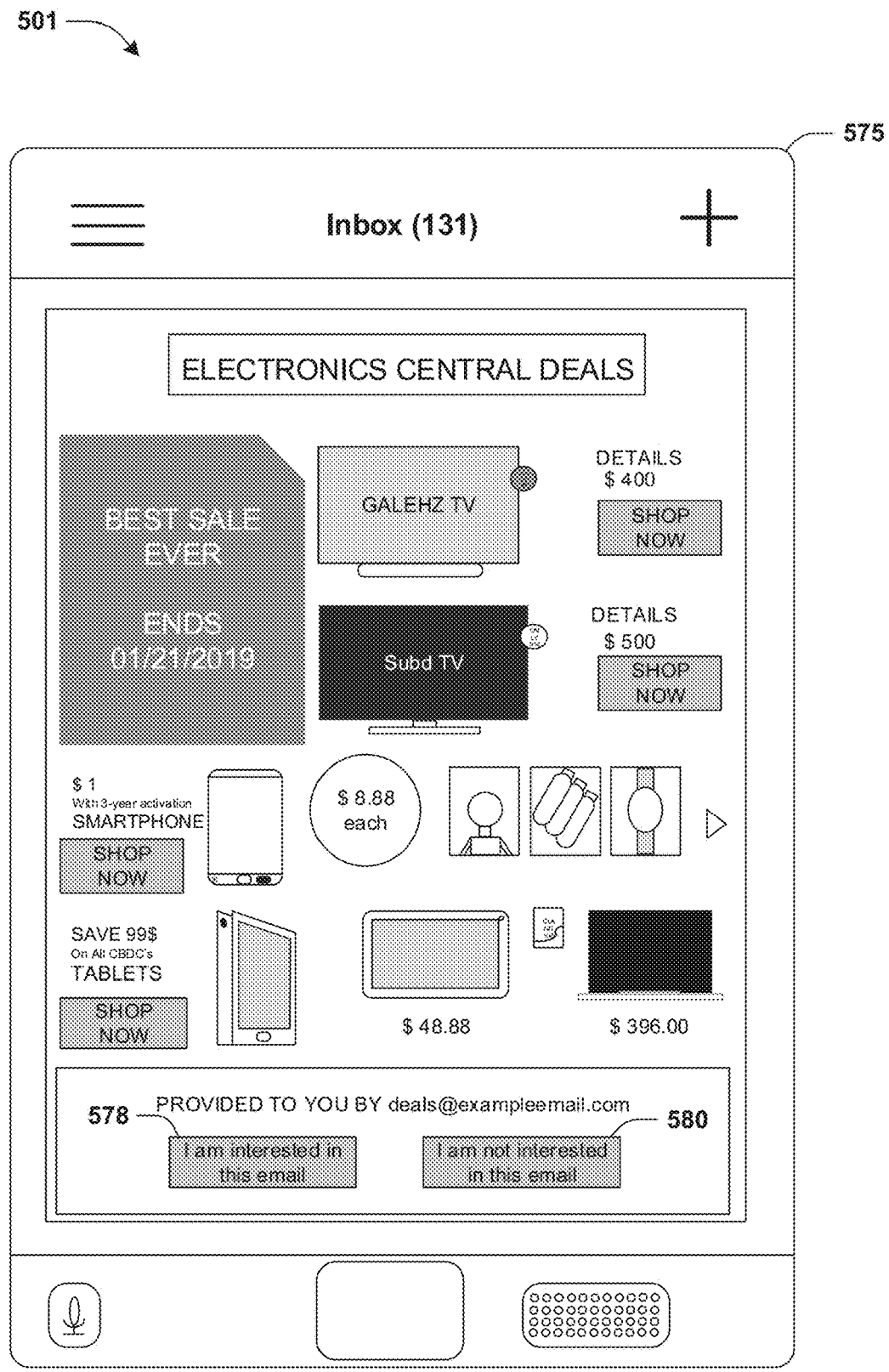
FIG. 5F is a component block diagram illustrating an example system for selecting messages for transmission to client devices, where a second graphical user interface of a second client device is controlled to display a first email.

FIG. 5F illustrates the second graphical user interface of the second client device 575 being controlled to display the first email 538. For example, the first email 538 may comprise a representation of the first file 510. The first email 538 may comprise a third selectable input 578 "I am interested in this email" corresponding to the first user having an interest in the first email 538. Alternatively and/or additionally, the first email 538 may comprise a fourth selectable input 580 "I am not interested in this email" corresponding to the first user not having an interest in the first email 538.

For example, responsive to a selection of the third selectable input 578, a first user profile associated with the first email account may be modified based upon the selection of the third selectable input 578 and/or transmissions of emails associated with the first entity and/or the set of topics to the first email account may be increased. Alternatively and/or additionally, responsive to a selection of the fourth selectable input 580, the first user profile may be modified based upon the selection of the fourth selectable input 580 and/or transmissions of emails associated with the first entity and/or the set of topics to the first email account may be decreased.

It may be appreciated that the disclosed subject matter may assist a user (e.g., and/or a client device associated with the user) in viewing and/or consuming content associated with subject matter that the user has an interest in. Alternatively and/or additionally, the disclosed subject matter may assist the user (e.g., and/or the client device) in receiving emails associated with entities from an information service that an email account associated with the user is subscribed to, without having to subscribe to information services associated with the entities separately. Alternatively and/or additionally, the disclosed subject matter may assist the user (e.g., and/or the client device) in managing settings associated with the information service more conveniently.

Implementation of at least some of the disclosed subject matter may lead to benefits including, but not limited to, a reduction in screen space and/or an improved usability of a display (e.g., of the client device) (e.g., as a result of enabling the user to automatically consume content associated with subject matter that the user has an interest in, wherein the user may not view content that the user does not have an interest in, wherein the user may not need to open a separate application and/or a separate window in order to find content having the subject matter that the user has an interest in, etc.).

Alternatively and/or additionally, implementation of at least some of the disclosed subject matter may lead to benefits including a reduction in screen space and/or an improved usability of the display (e.g., as a result of a user profile being updated based upon detected activity, indications of content that the user is not interested in and/or indications of content that the user is interested in without requiring that the user open a separate application and/or a separate window in order to find content having the subject matter that the user has an interest in and/or to cease receiving subject matter that the user does not have an interest in, even if interests of the user change over time, etc.).

Alternatively and/or additionally, implementation of at least some of the disclosed subject matter may lead to benefits including a reduction in screen space and/or an improved usability of the display (e.g., as a result of enabling the user to consume content associated with a plurality of entities without having to subscribe to a plurality of information services associated with the plurality of entities, as a result of enabling the user to modify settings associated with the information service without having to interact with the plurality of information services, etc.).

Alternatively and/or additionally, implementation of at least some of the disclosed subject matter may lead to benefits including a reduction in bandwidth (e.g., as a result of reducing a need for the user to open a separate application and/or a separate window in order to search throughout the internet and/or navigate through internet content to find content that the user has an interest in).

Alternatively and/or additionally, implementation of at least some of the disclosed subject matter may lead to benefits including more accurate and precise transmission of content to intended users (e.g., as a result of automatically determining locations, topics, entities, times of day and/or days of the week associated with users, as a result of transmitting content to each user based upon the locations, the topics, the entities, the times of day and/or the days of the week, etc.).

Alternatively and/or additionally, implementation of at least some of the disclosed subject matter may lead to benefits including a faster identification of content to be transmitted and/or faster loading of the content on a receiving device. For example, by using the content system, user profiles and email account databases, as provided for herein, accurate content can be identified at an increased speed, and thus delay between a determination to transmit content and transmission of the content and/or displaying of the content can be reduced.

Alternatively and/or additionally, implementation of at least some of the disclosed subject matter may lead to benefits including preventing unauthorized access to personal information associated with the user (e.g., as a result of enabling the user to consume content associated with the plurality of entities without having to provide personal information to the plurality of entities in order to subscribe to the plurality of information services, etc.). Alternatively and/or additionally, implementation of at least some of the disclosed subject matter may lead to benefits including decreasing security resources needed to protect the personal information from unauthorized access.

In some examples, at least some of the disclosed subject matter may be implemented on a client device, and in some examples, at least some of the disclosed subject matter may be implemented on a server (e.g., hosting a service accessible via a network, such as the Internet).

Figure 6:
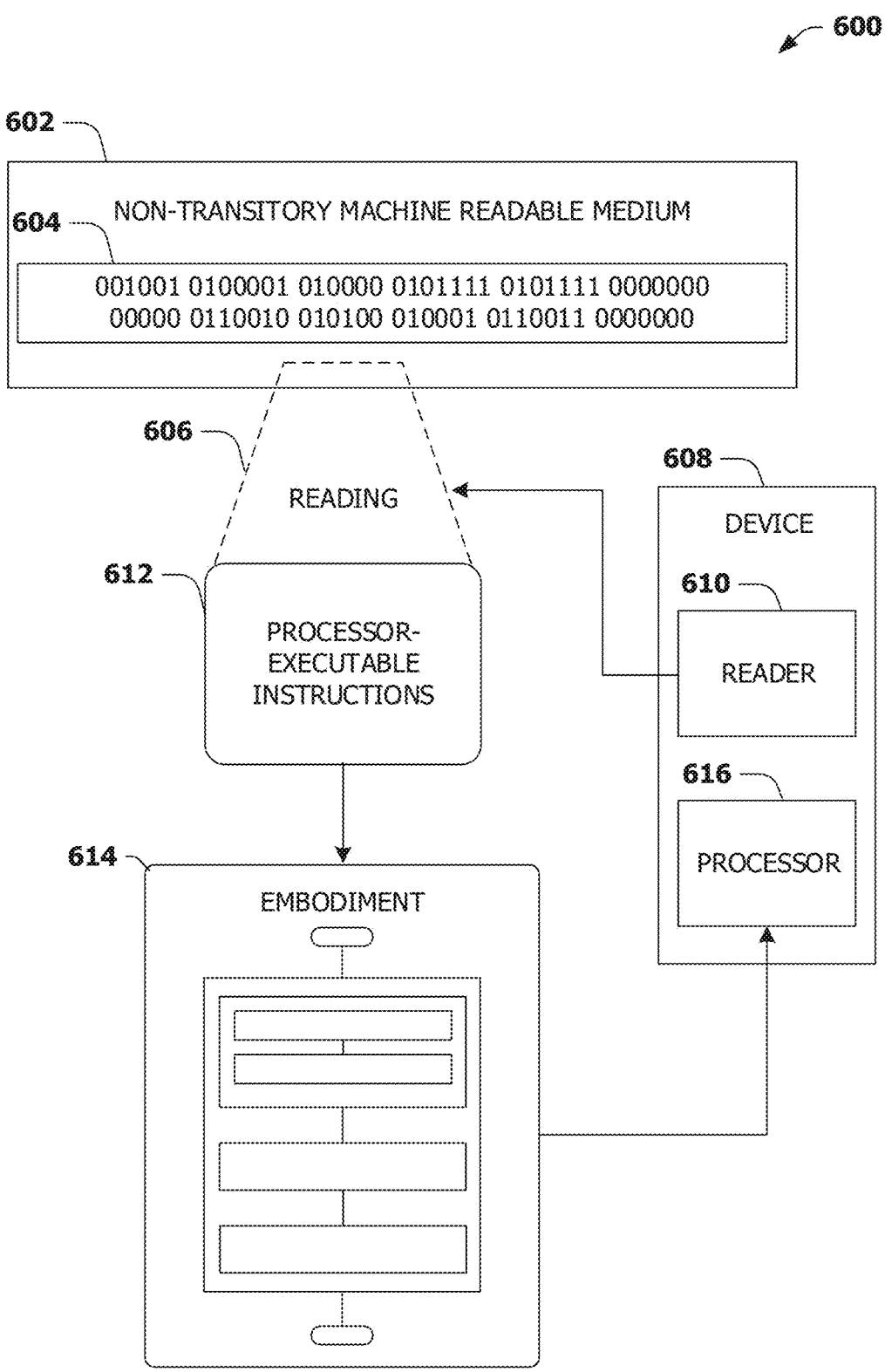
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5F, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method implemented by a server associated with an information service, the method comprising:
    receiving, by the server, a first email from a client device associated with a first entity, wherein the first email comprises information associated with the first entity but not personal information indicative of target recipients of contents of the first email;
    responsive to receiving the first email from the client device associated with the first entity:
        analyzing, by the server associated with the information service and based upon the first email, an email account database comprising a plurality of user profiles, wherein the analyzing comprises determining whether each user profile of the plurality of user profiles is associated with the first email; and
        based upon the analyzing based upon the first email, selecting a set of email accounts to be addressed as the target recipients of the contents of the first email from a plurality of email accounts subscribed to the information service, wherein the selecting the set of email accounts is based upon each user profile associated with the set of email accounts being associated with the first email,
        wherein one or more other email accounts of the plurality of email accounts subscribed to the information service are not selected to be addressed as the target recipients of the contents of the first email based upon each user profile associated with the one or more other email accounts not being associated with the first email,
        wherein each user profile of the plurality of user profiles comprises information corresponding to an email account of the plurality of email accounts;
    generating, based upon the first email, a set of emails for the set of email accounts selected to be addressed as the target recipients of the contents of the first email; and
    transmitting, by the server associated with the information service, the set of emails to the set of email accounts selected to be addressed as the target recipients of the contents of the first email.

2. The method of claim 1, comprising:
    receiving, by the server associated with the information service, a subscription request from a client device associated with a second email account;
    responsive to receiving the subscription request, generating, by the server associated with the information service, a user profile corresponding to the second email account; and
    storing, by the server associated with the information service, the user profile in the email account database.

3. The method of claim 1, wherein:
    the first email is associated with a first location; and
    the analyzing the email account database to select the set of email accounts comprises determining that a user profile corresponding to each email account of the set of email accounts is indicative of the first location.

4. The method of claim 1, wherein:
    the first email is associated with a first topic; and
    the analyzing the email account database to select the set of email accounts comprises determining that a user profile corresponding to each email account of the set of email accounts is indicative of the first topic.

5. The method of claim 1, wherein the analyzing the email account database to select the set of email accounts comprises determining that a user profile corresponding to each email account of the set of email accounts is associated with the first entity.

6. The method of claim 1, comprising analyzing user profiles associated with the set of email accounts to determine a plurality of times of day associated with the set of email accounts, wherein the plurality of times of day comprise a first time of day and a second time of day, wherein:
    each time of day of the plurality of times of day corresponds to an email account of the set of email accounts, wherein the first time of day corresponds to a second email account and the second time of day corresponds to a third email account; and
    the transmitting the set of emails to the set of email accounts is performed by transmitting each email of the set of emails at a time associated with a time of day corresponding to an email account that the email is transmitted to, wherein the transmitting the set of emails to the set of email accounts comprises transmitting a second email of the set of emails to the second email account at the first time of day corresponding to the second email account and transmitting a third email of the set of emails to the third email account at the second time of day corresponding to the third email account.

7. The method of claim 1, comprising:
    receiving, by the server associated with the information service, a user settings message from a second email account of the plurality of email accounts; and
    analyzing, by the server associated with the information service, the user settings message to determine at least one of:
        one or more locations associated with the second email account;
        one or more topics associated with the second email account;
        one or more entities associated with the second email account; or
        one or more times of day associated with the second email account.

8. The method of claim 7, comprising:
    modifying, by the server associated with the information service, a first user profile, associated with the second email account, based upon the user settings message, wherein the first user profile is indicative of at least one of the one or more locations, the one or more topics, the one or more entities or the one or more times of day; and storing, by the server associated with the information service, the first user profile in the email account database.

9. The method of claim 1, wherein the set of emails comprises one or more emails that are the same as the first email.

10. The method of claim 1, wherein the set of emails comprises one or more emails that are different than the first email.

11. A computing device comprising:
a processor; and
memory comprising processor-executable instructions that when executed by the processor cause performance of operations, the operations comprising:
receiving, by a server associated with an information service, a first message from a client device associated with a first entity, wherein the first message comprises information associated with the first entity;
responsive to receiving the first message from the client device associated with the first entity:
analyzing, by the server associated with the information service and based upon the first message, a user account database comprising a plurality of user profiles, wherein the analyzing comprises determining whether each user profile of the plurality of user profiles is associated with the first message; and
based upon the analyzing, selecting a set of user accounts to be addressed as target recipients of contents of the first message from a plurality of user accounts subscribed to the information service, wherein the selecting the set of user accounts is based upon each user profile associated with the set of user accounts being associated with the first message,
wherein one or more other user accounts of the plurality of user accounts subscribed to the information service are not selected to be addressed as the target recipients of the contents of the first message,
wherein each user profile of the plurality of user profiles comprises information corresponding to a user account of the plurality of user accounts;
generating, based upon the first message, a set of messages for the set of user accounts selected to be addressed as the target recipients of the contents of the first message; and
transmitting, by the server associated with the information service, the set of messages to a set of client devices associated with the set of user accounts selected to be addressed as the target recipients of the contents of the first message.

12. The computing device of claim 11, the operations comprising:
receiving a subscription request from a second client device associated with a first user account;
responsive to receiving the subscription request, generating a user profile corresponding to the first user account; and
storing the user profile in the user account database.

13. The computing device of claim 11, wherein:
the first message is associated with a first location; and the analyzing the user account database to select the set of user accounts comprises determining that a user profile corresponding to each user account of the set of user accounts is indicative of the first location.

14. The computing device of claim 11, wherein:
the first message is associated with a first topic; and
the analyzing the user account database to select the set of user accounts comprises determining that a user profile corresponding to each user account of the set of user accounts is indicative of the first topic.

15. The computing device of claim 11, wherein the first message comprises a file uploaded to the server via a file upload interface.

16. The computing device of claim 11, the operations comprising analyzing user profiles associated with the set of user accounts to determine a plurality of times of day associated with the set of user accounts, wherein:
each time of day of the plurality of times of day corresponds to a user account of the set of user accounts; and
the transmitting the set of messages to the set of client devices associated with the set of user accounts is performed by transmitting each message of the set of messages at a time associated with a time of day corresponding to a user account that the message is transmitted to.

17. The computing device of claim 11, the operations comprising:
receiving a user settings message from a second client device associated with a first user account of the plurality of user accounts; and
analyzing the user settings message to determine at least one of:
one or more locations associated with the first user account;
one or more topics associated with the first user account;
one or more entities associated with the first user account; or
one or more times of day associated with the first user account.

18. The computing device of claim 17, the operations comprising:
modifying a first user profile, associated with the first user account, based upon the user settings message, wherein the first user profile is indicative of at least one of the one or more locations, the one or more topics, the one or more entities or the one or more times of day; and
storing the first user profile in the user account database.

19. A non-transitory machine readable medium having stored thereon processor-executable instructions that when executed cause performance of operations, the operations comprising:
receiving a first message associated with a first entity from a first client device, wherein the first message comprises information associated with the first entity;
responsive to receiving the first message associated with the first entity from the first client device, analyzing, based upon the first message, an email account database comprising a plurality of user profiles to select a set of email accounts, from a plurality of email accounts subscribed to an information service, for transmission of a set of emails associated with the first message, wherein each user profile of the plurality of user profiles comprises information corresponding to an email account of the plurality of email accounts;
analyzing user profiles associated with the set of email accounts to determine a plurality of times of day associated with the set of email accounts, wherein the plurality of times of day comprise a first time of day and a second time of day, wherein each time of day of the plurality of times of day corresponds to an email account of the set of email accounts, wherein the first time of day corresponds to a second email account and the second time of day corresponds to a third email account; and transmitting the set of emails to the set of email accounts, wherein the transmitting the set of emails to the set of email accounts is performed by transmitting each email of the set of emails at a time associated with a time of day corresponding to an email account that the email is transmitted to, wherein the transmitting the set of emails to the set of email accounts comprises transmitting a second email of the set of emails to the second email account at the first time of day corresponding to the second email account and transmitting a third email of the set of emails to the third email account at the second time of day corresponding to the third email account.

20. The non-transitory machine readable medium of claim 19, the operations comprising:
receiving a subscription request from a fourth email account;
responsive to receiving the subscription request, generating a fourth user profile corresponding to the fourth email account; and
storing the fourth user profile in the email account database.

* * * * *